(12) United States Patent
Rippel et al.

(10) Patent No.: US 12,463,548 B2
(45) Date of Patent: Nov. 4, 2025

(54) POLYPHASE AC TO DC CONVERTER

(71) Applicant: ENURE, INC., Los Angeles, CA (US)

(72) Inventors: Wally E. Rippel, Altadena, CA (US); Eric E. Rippel, Los Angeles, CA (US)

(73) Assignee: ENURE, INC., Los Angeles, CA (US)

( * ) Notice: Subject to any disclaimer, the term of this patent is extended or adjusted under 35 U.S.C. 154(b) by 173 days.

(21) Appl. No.: 17/956,052

(22) Filed: Sep. 29, 2022

(65) Prior Publication Data

US 2023/0106121 A1 Apr. 6, 2023

Related U.S. Application Data

(60) Provisional application No. 63/250,074, filed on Sep. 29, 2021.

(51) Int. Cl.

| | |
|---|---|
| *H02M 7/217* | (2006.01) |
| *B60L 53/20* | (2019.01) |
| *H02M 1/00* | (2006.01) |
| *H02M 3/335* | (2006.01) |
| *H02M 7/00* | (2006.01) |
| *H02M 7/219* | (2006.01) |

(52) U.S. Cl.
CPC ........... *H02M 7/2173* (2013.01); *B60L 53/20* (2019.02); *H02M 1/0064* (2021.05); *H02M 1/007* (2021.05); *H02M 1/008* (2021.05); *H02M 3/33584* (2013.01); *H02M 7/003* (2013.01); *H02M 7/219* (2013.01); *B60L 2210/30* (2013.01)

(58) Field of Classification Search
CPC .... H02M 7/003; H02M 7/2173; H02M 3/335; H02M 3/33584; H02M 1/0064; H02M 1/007; H02M 7/219; B60L 53/20; B60L 2210/30

See application file for complete search history.

(56) References Cited

U.S. PATENT DOCUMENTS

| | | | | |
|---|---|---|---|---|
| 5,751,150 A | * | 5/1998 | Rippel | G01R 31/2841 363/72 |
| 8,432,138 B2 | * | 4/2013 | Chen | H02M 1/4233 363/125 |
| 2002/0033692 A1 | * | 3/2002 | Sakai | H02J 9/061 320/134 |
| 2002/0140403 A1 | * | 10/2002 | Reddy | H02J 9/062 320/162 |
| 2005/0117374 A1 | | 6/2005 | Sheehy et al. | |
| 2008/0074911 A1 | | 3/2008 | Petter | |

(Continued)

OTHER PUBLICATIONS

International Search Report and Written Opinion of the International Searching Authority, mailed Jan. 3, 2023, corresponding to PCT/US2022/045179, 10 pages.

*Primary Examiner* — Gary L Laxton
(74) *Attorney, Agent, or Firm* — Womble Bond Dickinson (US) LLP

(57) ABSTRACT

A system including a polyphase regulator. In some embodiments, the system includes: a first magnetic element, n switching poles, n being an integer greater than 2, a first port having a first node and a second node, and a second port having a first node and a second node. The first magnetic element may include n phase ports and an averaging port, and each of the n switching poles may include a phase node.

17 Claims, 36 Drawing Sheets

(56) References Cited

U.S. PATENT DOCUMENTS

| | | | |
|---|---|---|---|
| 2008/0224812 A1* | 9/2008 | Chandrasekaran | H02M 7/217 336/212 |
| 2011/0316461 A1 | 12/2011 | Rippel | |
| 2012/0106216 A1 | 5/2012 | Tzinker et al. | |
| 2017/0250025 A1* | 8/2017 | Wei | H01F 41/069 |
| 2019/0372465 A1* | 12/2019 | Xu | H02M 3/33571 |
| 2020/0312595 A1 | 10/2020 | Rippel et al. | |
| 2022/0045619 A1* | 2/2022 | Jia | H02M 3/33573 |
| 2022/0224225 A1* | 7/2022 | Chen | H02M 1/32 |

* cited by examiner

POLYPHASE AC TO DC CONVERTER

CROSS-REFERENCE TO RELATED APPLICATION(S)

The present application claims priority to and the benefit of U.S. Provisional Application No. 63/250,074, filed Sep. 29, 2021, entitled "POLYPHASE AC TO DC CONVERTER", the entire content of which is incorporated herein by reference.

FIELD

One or more aspects of embodiments according to the present disclosure relate to a magnetic element, and more particularly to circuits including a magnetic element.

BACKGROUND

DC switching regulators are power processors which efficiently convert DC power from one voltage level to another. Examples include the buck regulator (see FIG. 1), the boost regulator (see FIG. 2), and the bi-directional buck regulator (see FIG. 3). Switching regulators are the essential core elements for nearly all power supplies and power converters. In turn, semiconductor switches, controllers, capacitors, and inductors are their conventional building blocks.

Over the past several decades, most of the technical progress has centered with the semiconductor switches and controllers. Modest progress has taken place with capacitors, while inductors have seen little gain and now directly or indirectly account for the majority of size, cost, and power loss for most regulators.

By replacing the basic single phase switching regulator of FIG. 1 with the polyphase regulator of FIG. 4, capacitor size, cost, and power loss can each be significantly reduced, thanks to current harmonic cancellation. With the FIG. 4 approach, duty cycles of the individual phases are maintained mutually equal and evenly distributed over the switching period; waveforms are shown in FIG. 5. Unfortunately, the overall size, cost, and power loss associated with the inductors actually get worse as the number of phases is increased. Given the fact that the inductors far dominate the capacitor in terms of size, cost, and power loss, it follows that the polyphase approach is typically counterproductive.

By replacing the multiple inductors of FIG. 4 with a new magnetic element—consisting of an averaging transformer and inductance (see FIG. 6), overall magnetics size, cost and power loss can each be reduced compared with that of FIGS. 1 through 4. Waveforms for the FIG. 6 approach are shown in FIG. 7. The new approach uses transformer action to mathematically average the n number of phase signals—thus reducing ripple volt-seconds by a factor of n squared. As such, required inductance can be reduced by this factor. In some cases, leakage inductance within the averaging transformer is sufficiently high such that a physical inductor is not required.

With conventional regulators, such as those of FIG. 1, 2, or 3, inductance is typically selected such that the peak to peak ripple current is approximately 50% that of the rated DC current. For smaller values of inductance, AC ripple currents becomes excessive and efficiency drops because of high AC losses. For larger values of inductance, DC winding losses become excessive and efficiency drops because of high DC losses. Since core saturation ($B_m$) must occur at currents which are greater than the rated current, it then follows that the flux swing must be less than $0.5*B_m$ for such inductors. This compares with transformers where the flux swing can approach $2*B_m$. Since the through-power of inductors and transformers is proportionate to flux swing, it follows that the physical size of inductors must be about twice that of a conventional transformer (which have both primary and secondary windings) and about four times that of an auto-transformer (which has essentially only one winding). It is for this reason that an averaging transformer (which functions as an auto-transformer), is on the order of one fourth the volume and mass of an inductor rated for the same power.

It is noted that core loss increases slightly more rapidly that the square of flux swing. As such, it would appear that by replacing inductors with transformers, that overall losses might increase due to rapidly increasing core losses. In the case where modest switching frequencies are involved (e.g. 10 to 20 kHz) and where low loss cores are used such as Sendust or Ferrite, initial core losses are sufficiently low that even with the increased flux swing, they remain relatively small. Winding losses are typically reduced because of reduced winding length and reduced leakage flux which enters the winding. It should also be noted that with the FIG. 6 approach, optimal switching frequencies are typically lower as compared with conventional single phase approaches. This has the added benefit of reduced semiconductor switching losses.

SUMMARY

A new AC to DC power converter is identified comprising an AC port, an AC to DC converter, a regulator, and a DC port. The AC to DC converter may comprise either a diode rectifier, an active rectifier (synchronous rectifier), or any other element which converts AC into DC. The regulator may comprise a high-voltage port, a low-voltage port, n number of switching poles (where n is an integer greater than two), a magnetic element, and a controller. In turn, the magnetic element includes n number of phase ports and one averaging port. Each switching pole comprises a high-side switch and a low-side switch which serially connect to form a phase node. Each switching pole phase node connects to a respective phase port of the magnetic element. The controller drives each of the n switching poles such that respective duty cycles may be mutually equal and symmetrically or substantially symmetrically distributed over one switching period.

The magnetic element serves as an averaging transformer combined with inductance. By combining transformer action with inductance, the magnetic element size and loss are significantly reduced compared with that of conventional inductors. The converter can interface with either single phase or polyphase AC power and is capable of unity power factor operation. Based on the selection of low-side and high side switches and interconnection of the regulator low-voltage and high-voltage ports, buck, boost, or flyback operation is possible. The new converter applies to battery chargers, DC power supplies, and any circumstance where unidirectional or bi-directional AC to DC power conversion is required.

1. According to an embodiment of the invention, there is provided a circuit having an AC power port, a rectifier, an n-phase switching regulator, and a DC port, where the AC port applies AC input power to the rectifier, the rectifier applies DC power to the n-phase switching regulator, and the n-phase switching regulator applies DC power to the DC port, where the n-phase switching regulator includes n number of switching poles, a controller, and an n-phase magnetic element which in turn includes n number of phase ports and one averaging port, where the phase node of each switching pole connects to a respective phase port of the n-phase magnetic element, and where n is an integer greater than two.

2. According to an embodiment of the invention, there is provided a circuit having an AC power port, a transformer, a rectifier, an n-phase switching regulator, and a DC port, where the AC port applies AC input power to the transformer, the transformer applies AC power to the rectifier, the rectifier applies DC power to the n-phase switching regulator, and the n-phase switching regulator applies DC power to the DC port, where the n-phase switching regulator includes n number of switching poles, a controller, and an n-phase magnetic element which in turn includes n number of phase ports and one averaging port, where the phase node of each switching pole connects to a respective phase port of the n-phase magnetic element, and where n is an integer greater than two.

3. According to an embodiment of the invention, there is provided a circuit having a first DC power port, an inverter, a transformer, a rectifier, an n-phase switching regulator, and a second DC port, where the first DC port applies DC input power to the inverter, the inverter applies AC power to the transformer, the transformer applies AC power to the rectifier, the rectifier applies DC power to the n-phase switching regulator, and the n-phase switching regulator applies DC power to the second DC port, where the n-phase switching regulator includes n number of switching poles, a controller, and an n-phase magnetic element which in turn includes n number of phase ports and one averaging port, where the phase node of each switching pole connects to a respective phase port of the n-phase magnetic element, and where n is an integer greater than two 4. In some embodiments, the switching regulator is configured as a uni-directional buck regulator.

5. In some embodiments, the switching regulator is configured as a bi-directional buck regulator.

6. In some embodiments, the switching regulator is configured as a uni-directional boost regulator.

7. In some embodiments, the switching regulator is configured as a bi-directional boost regulator.

8. In some embodiments, n number of individual transformers are used to effect the n-phase magnetic element.

9. In some embodiments, a single transformer having one core is used to effect the n-phase magnetic element.

10. In some embodiments, a single averaging transformer is used which has n number of core prongs, each having a single winding to effect the magnetic element.

11. In some embodiments, a single averaging transformer is used which has n number of core prongs, each having two windings which have equal numbers of turns to effect the magnetic element.

12. In some embodiments, a single averaging transformer is used which has n number of core prongs, each having two windings which have unequal numbers of turns to effect the magnetic element.

13. In some embodiments, a single averaging transformer is used which has n number of core prongs, each having two co-wound or bifilar wound windings of equal number of turns.

14. In some embodiments, averaging transformer windings are edge-wound and at least a portion the winding outer surfaces are in close thermal contact with a heatsink.

15. In some embodiments, at least a portion of the averaging transformer core is in close thermal contact with a heatsink.

16. In some embodiments, averaging transformer windings are edge-wound with axial gaps between adjacent turns and where a coolant is forced to radially flow between said gaps.

17. In some embodiments, coolant flow is directed over at least a portion of the averaging transformer core.

18. In some embodiments, a single averaging transformer is used which includes an n+1 th prong having no windings—for the purpose of adding inductance to effect the magnetic element.

19. In some embodiments, an external inductor is connected in series with the averaging port of the averaging transformer to effect the magnetic element.

20. In some embodiments, the controller connects to each of the switching poles and provides control signals such that the duty cycles of each switching pole are mutually equal and symmetrically spaced over the switching period.

21. In some embodiments, switching duty cycles are controlled such that ripple voltage and ripple current at the regulator output are reduced compared with the case where switching duty cycles are held constant.

22. In some embodiments, the rectifier is a single phase diode bridge.

23. In some embodiments, the rectifier is a polyphase phase diode bridge.

24. In some embodiments, the rectifier is a single phase active front end.

25. In some embodiments, the rectifier is a polyphase active front end.

26. In some embodiments, the rectifier is a polyphase active front end, where each rectifier phase comprises an n-phase switching regulator which, in turn, includes an n-phase magnetic element.

DETAILED DESCRIPTION OF THE DRAWINGS

Figure 1:
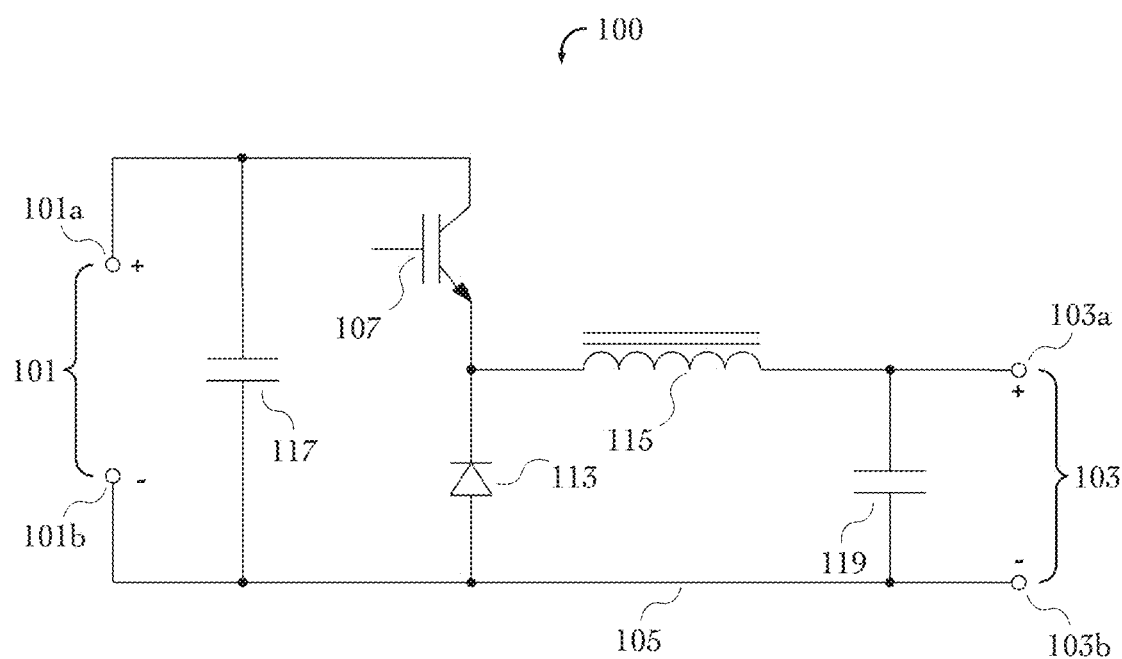
FIG. 1 is the block schematic for a conventional unidirectional buck regulator.

FIGS. 1 through 4 deal with background to the invention. FIG. 1 shows single phase buck regulator 100 comprising first port 101, first capacitor 117, high-side switch 107, low-side diode 113, inductor 115, second capacitor 119, second port 103, and first node 105. During steady state operation, high-side switch 107 is driven by a duty cycle waveform such that on intervals are equal to D*T and off intervals are equal to (1−D)*T, where T is the waveform period and D is the duty cycle. While FIG. 1 and subsequent figures indicate first capacitor 117 is connected to first port 101, it should be noted that first capacitor 117 may be part of an external circuit which connects to first port 101. Likewise, second capacitor 119 may be part of an external circuit which connects to second port 103.

During on periods, energy is transferred from first port 101 and first capacitor 117 to inductor 115 and second port 103. During this time, inductor current increases by ΔI which is equal to (Vin−Vout)*D*T/L, where L is the inductance associated with inductor 115 (ΔI is termed inductor current swing). During off periods, energy is transferred from inductor 115 to second port 103; during this time, the inductor current decreases by ΔI. In steady state, the voltage at second port 103 is equal to D times the voltage at first port 101.

Port 101 includes conductor 101a (designated positive) and conductor 101b (designated negative). Likewise, port 103 includes conductor 103a (designated positive) and conductor 103b (designated negative). It should be noted that the positive and negative polarities are for reference only and that polarities at both ports can be transposed assuming the polarities of high-side switch 107 and low-side diode 113 are also transposed. This principle of equivalence applies to FIG. 1 and all subsequent figures. Finally, it should be noted that in all cases, first node 105 is common to conductors 101*b* and 103*b*, independent of port polarity.

The terms "port" and "node", as used herein, are not to be considered as being mutually exclusive, and, for example, the conductors of a port may also be nodes. For example, the "first port 101", which comprises conductors (nodes) 101*a* and 101*b*, remains a "port" after external components—such as a rectifier or power source—have been connected to this port—. Prior to and after any such connection, conductors 101*a* and 101*b* can be considered as circuit nodes. Finally, the term, "port" as used herein is not limited to two conductors and may comprise any number of conductors, so long as the vector sum of the respective currents is zero.

The optimal value of inductance for inductor 115 is based mainly on a trade-off between AC and DC losses. As inductance is increased, AC ripple currents and AC losses decrease, while DC losses, inductor size, and inductor cost all increase. For most designs, the optimal value of inductance is where ΔI is approximately half that of the rated current for the low-voltage port (second port 103).

For regulators rated 10 kW and above, inductor 115 may account for roughly half the regulator total loss, half the total cost, and typically the majority of mass.

Capacitors 117 and 119 serve to decouple ripple currents at the respective ports. Capacitive values must be adequately high such that respective port ripple voltages do not exceed design limits. Capacitor current ratings must exceed worst case ripple current values. Typically, these two capacitors account for only a few percent of regulator cost and power loss.

Figure 2:
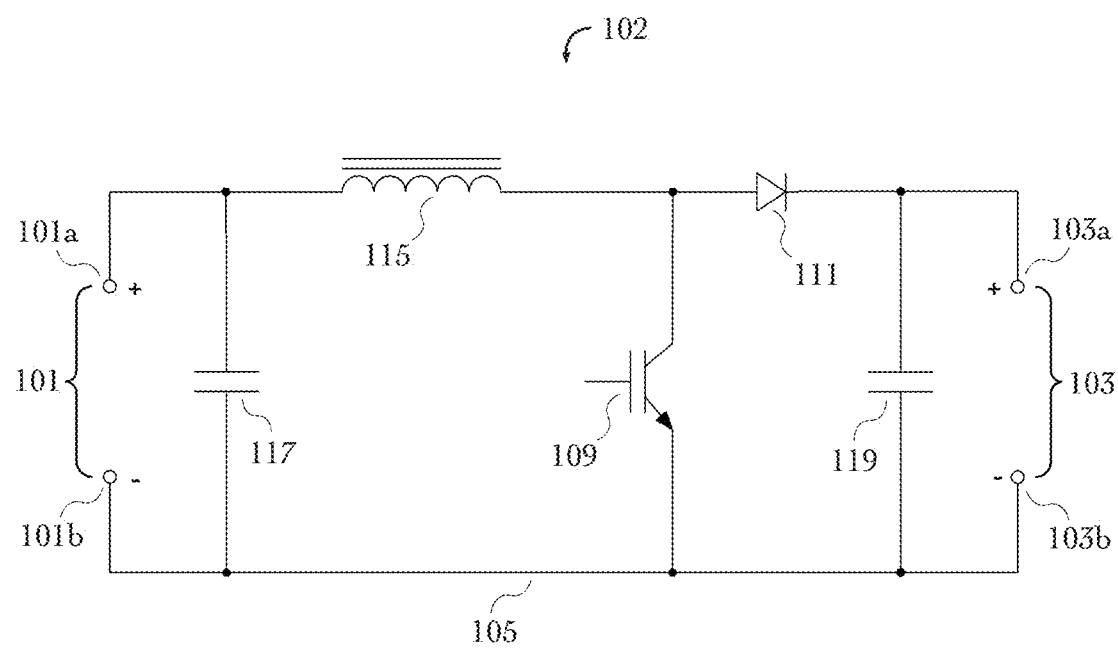
FIG. 2 is the block schematic for a conventional unidirectional boost regulator.

By rearranging the components of the FIG. 1 buck regulator, single phase boost regulator 102 is realized, as shown in FIG. 2. With the boost regulator, voltage at second port 103 is equal to voltage at first port 101 divided by (1−D). For the FIG. 2 boost regulator, component ratings and losses are similar to that of the FIG. 1 buck regulator. Note that for both the FIG. 1 and FIG. 2 regulators, first node 105 is common to both first port 101 and second port 103.

Figure 3:
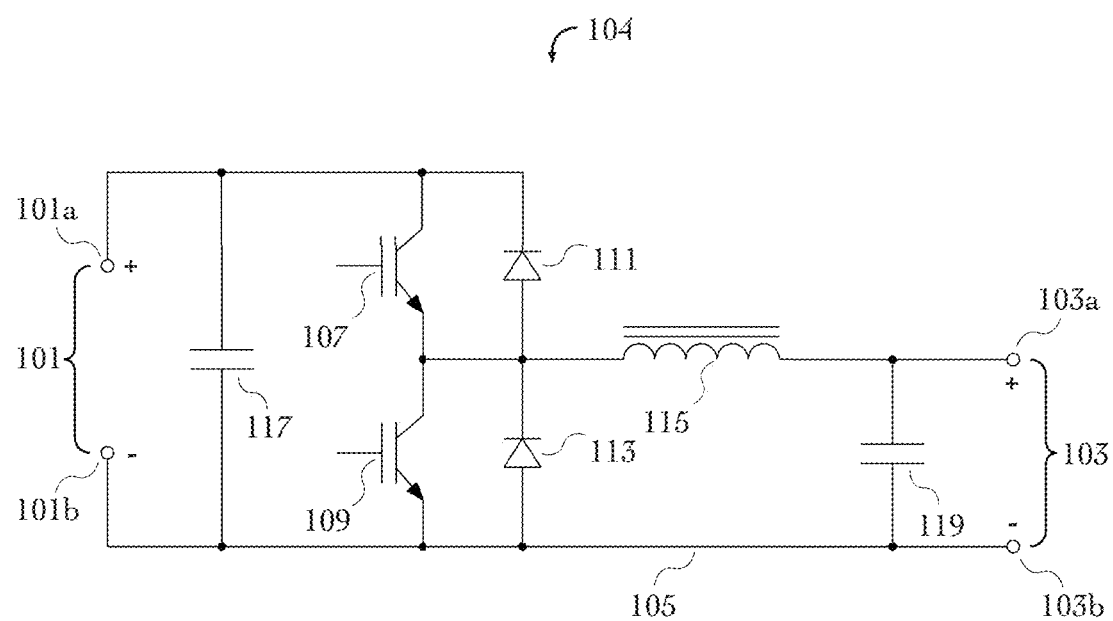
FIG. 3 is the block schematic for a conventional bidirectional buck regulator.

By adding high-side diode 111 in parallel with switch 107 and low-side switch 109 in parallel with diode 113, the unidirectional buck regulator of FIG. 1 becomes bidirectional buck regulator 104 as shown in FIG. 3. The ratio between voltages at ports 103 and 101 remains equal to D, where D is the duty cycle of high-side switch 107. With the bidirectional regulator, power flow can be either from first port 101 to second port 103 or in the reverse direction.

Figure 4:
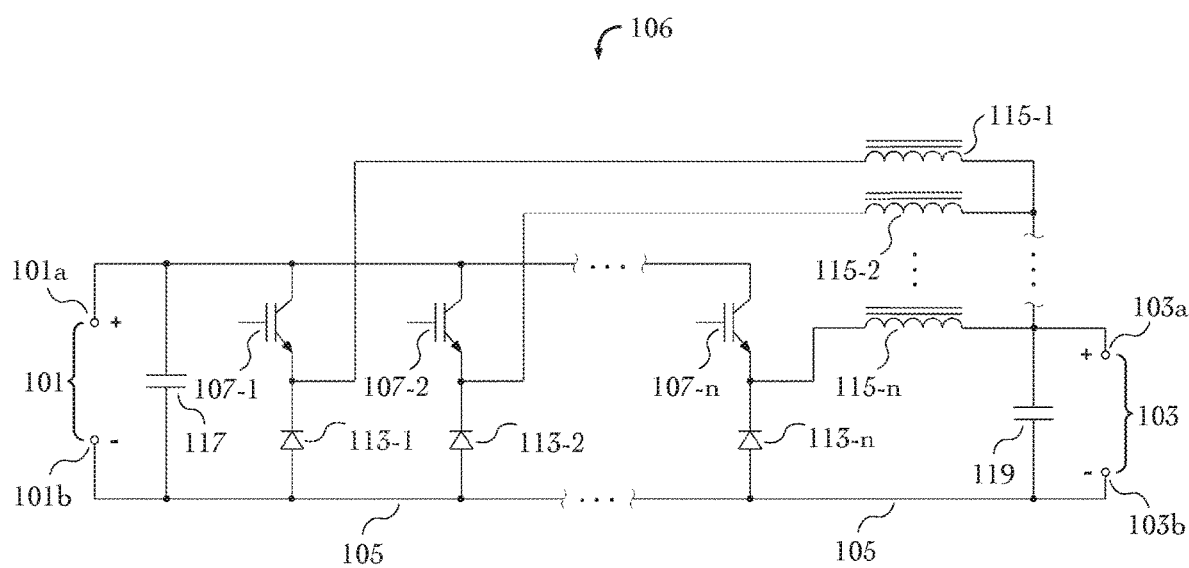
FIG. 4 is the block schematic for a conventional polyphase unidirectional buck regulator.
Figure 5:
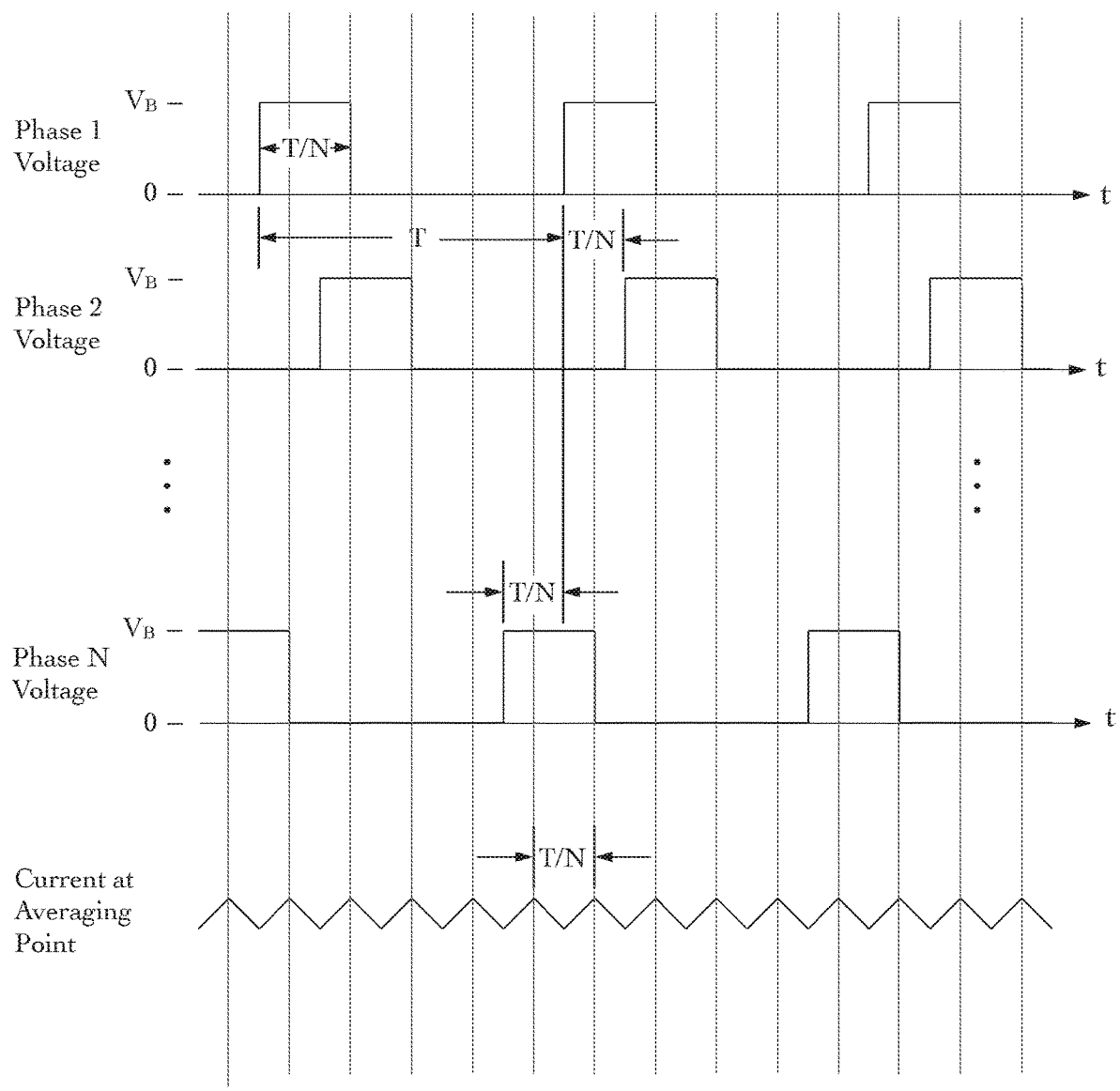
FIG. 5 is a timing diagram showing typical waveforms for the FIG. 4 polyphase regulator.

By connecting n regulators in parallel, each of the regulators shown in FIGS. 1 through 3 can be converted into polyphase regulator 106 of FIG. 4. (As used herein, the term "polyphase" designates any configuration where two or more phases are employed.) The n number of parallel capacitors at first port 101 can be replaced by a single capacitor 117. Likewise, the n number of capacitors at port 103 can be replaced by a single capacitor 119. Specifically, FIG. 4 shows the case where the FIG. 1 unidirectional buck regulator is converted into its n-phase equivalent. As shown in FIG. 5, switching waveforms may be symmetrically staggered such that ripple current components cancel and rms currents applied to capacitors 117 and 119 are minimized. In the case of the FIG. 1 regulator, worst case ripple currents occur when D=0.5, at which point rms current applied to capacitor 117 is approximately equal to half the input current and rms current applied to capacitor 119 is approximately 0.29*ΔI. In the case of the FIG. 4 n-phase regulator, worst case ripple currents occur when D=1/(2n)*(2*m−1), where m is an integer less than or equal to n. At these points of operation, the rms ripple current applied to first capacitor 117 is approximately 1/(2*n) times the first port current and ripple current applied to capacitor 119 is approximately 0.29*ΔI/n.

As indicated, capacitor currents are reduced by a factor of n by implementing the polyphase approach. Since ripple frequencies are increased by a factor of n, it follows that required capacitance values are reduced by a factor of n squared. Accordingly, implementation of n-phase regulation reduces capacitor size and cost by at least a factor of n.

Unfortunately, the total size and cost associated with the n number of inductors used in the FIG. 4 approach is actually higher than the size and cost associated with the single phase versions. Since inductor cost and size is typically much greater than that of the capacitors, it follows that utilizing the polyphase approach may be counterproductive.

The polyphase regulator environment provides an opportunity where AC ripple power can be exchanged between individual phases such that filter requirements can be greatly reduced. Specifically, a transformer can be configured which has a total of n+1 ports and where the instantaneous voltage at the n+1$^{th}$ port is the average of the instantaneous voltages appearing at ports 1 through n. (We can designate such a transformer an "averaging transformer"; ports 1 through n are designated "phase ports", and the n+1$^{th}$ port is designated the "averaging port".) Accordingly, by connecting each transformer phase port to a respective switching pole phase node, the instantaneous voltage appearing at the transformer averaging port is the average of the instantaneous phase voltages. As with any transformer, DC voltage components between the respective phase ports may be maintained to extremely small values such that core saturation does not occur. As such, the duty cycles associated with each switching pole typically may be maintained precisely equal.

With the above configuration, AC voltage components associated with the individual switching poles partly cancel or fully cancel such that a single inductor of relatively small size can be used to maintain ripple currents below a desired threshold. In the case where duty cycles are equal to m/n, complete cancellation occurs and voltage ripple appearing at the averaging port is essentially pure DC (n is the number of phases and m is a positive integer less than n). In the case where duty cycles are equal to (2m+1)/2n, ripple volt-seconds appearing at the averaging node is maximum and is equal to $V_1/(4f_s*n^2)$, where $V_1$ is the DC voltage appearing at port 101 and $f_s$ is the switching frequency. As such, the maximum ripple volt-second appearing at the averaging node is only $1/n^2$ that of a single pole. This in turn means that the required inductance which connects to the averaging port need be only $1/n^2$ the value associated with a conventional single phase regulator of the same total power rating. Hence, the size and mass of the inductor is reduced by a factor of approximately $n^2$ due to the action of the averaging transformer. Thus, in the case where six phases are used (n=6), the inductor size and mass can be reduced by approximately a factor of thirty six when compared to that of the FIG. 1 inductor.

The averaging transformer itself can also be small compared with the FIG. 1 inductor. For both inductors and transformers, power handling is proportionate to the swing in magnetic flux density. As such, the size of both transformers and inductors varies inversely with flux density swing. In the case of inductors, where flux density swing is proportionate to current ripple, flux density swing is typically constrained to about $0.5*B_m$, where $B_m$ is the flux density corresponding to magnetic saturation. With transformers, flux density swing can approach $2*B_m$. As such, transformer size and mass is on the order of one fourth that of an inductor having the same frequency and power ratings. The end result is that by replacing inductors 115-x of FIGS. 1 through 4 with magnetic element 121 of FIG. 6A (which includes both an averaging transformer and inductance) overall magnetics size and mass can be reduced by nearly a factor of four.

Because of the greater flux swing associated with averaging transformer 221, core losses are typically greater and winding losses are typically less—compared with conventional inductors having the same core material and which operate at the same frequency and power levels. In most cases, this trade is favorable as winding losses tend to dominate over core losses for conventional inductors—especially in high power applications where switching frequencies are typically limited to 20 kHz or less.

Because of the reduced inductance, polyphase switching regulators which use the new magnetic element typically will have much faster response times compared with conventional switching regulators. This is advantageous in the case of power supplies or servo systems where fast response is typically an important attribute. In the case of battery chargers, where the battery voltages changes very slowly, while utility line transients may be relatively fast, the fast response may be of little benefit or may even appear as a negative. However, it should be noted that for all cases where a utility input is involved, the utility line has a finite impedance which can aid in controlling current variations caused by line voltage transients. Finally, the reduced inductance has benefits in connection with fault situations such as the case where continuity is suddenly lost between the regulator output port and the load.

Figure 6A:
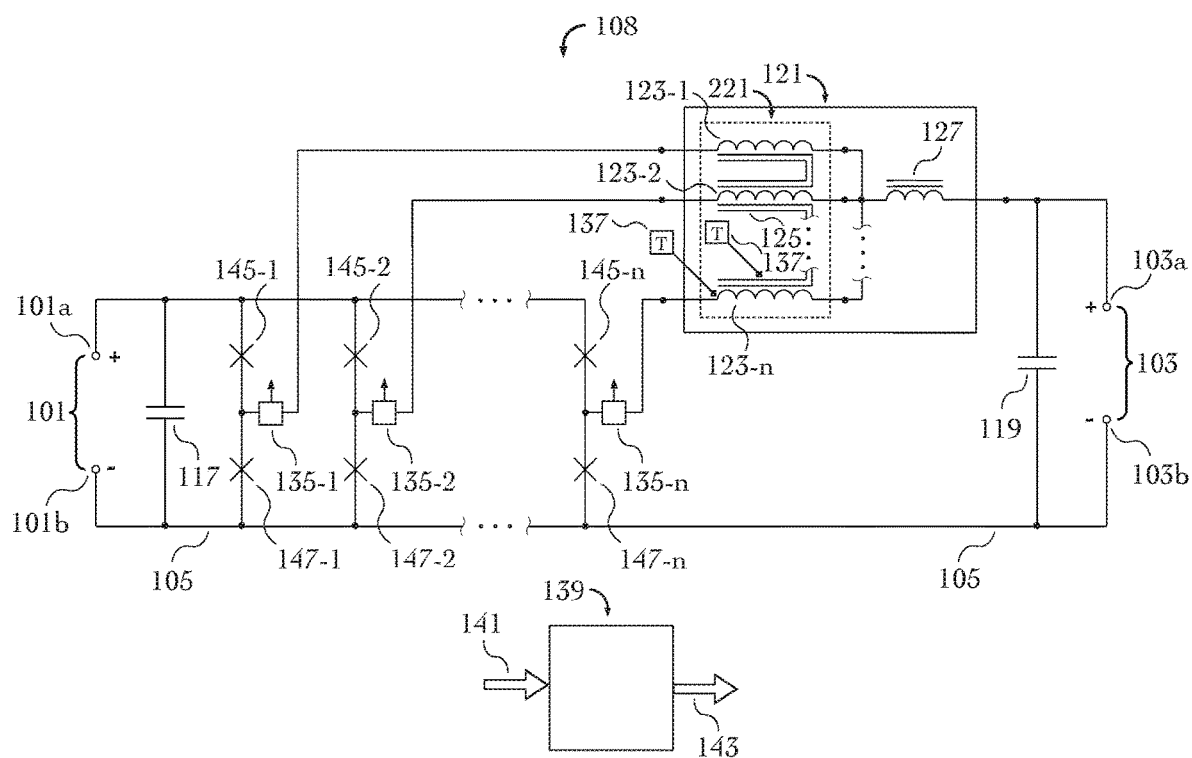
FIG. 6A is the block schematic for a polyphase buck regulator which includes a magnetic element containing an averaging transformer.

FIG. 6A is an embodiment of the invention which combines magnetic element 121 with conventional polyphase regulator elements to provide polyphase buck regulator 108. In FIG. 6A, high-side switching devices 145-x and low-side switching devices 147-x are drawn as an "X". This symbol is used to indicate a generic switching device, which may comprise a diode, a semiconductor switch (e.g., an IGBT, a MOSFET, or a bilateral switch), or the combination of a diode and semiconductor switch connected in parallel. As used herein, the combination of a high-side switching device connected in series with a low-side switching device may be termed a switching pole. In turn, magnetic element 121 includes averaging transformer 223 and external series inductance 127b, as shown in FIG. 6D.

In turn, averaging transformer 223 may be understood in terms of ideal equivalent components which include an ideal averaging transformer 221 and associated series leakage inductance 127a. In turn, ideal transformer 221 includes phase ports 129-x and averaging port 133c. Instantaneous current at averaging port 133c is equal to the sum of the instantaneous currents applied to phase ports 129-x, while the instantaneous voltage at averaging port 133c (referenced to a common point) is equal to the average of the instantaneous voltages applied to phase ports 129-x (referenced to the same common point).

Magnetic element 121 may include temperature sensor 137 which may be in thermal contact with a winding or the core such that the temperature of these elements can be reported to, for example, controller 139 or to a temperature indicator.

Several different embodiments of averaging transformer 223 are identified and will subsequently be discussed. In the general case, both transformer core 125 and phase windings 123-x are structured such that the above mentioned current summing and voltage averaging are achieved. In the general case, one or more windings are associated with each phase. As used herein, a "winding" is one or more turns of a conductor (e.g., one or more turns of wire).

Leakage inductance 127a is due to the fact that magnetic flux paths exist which are external to windings; flux lines which pass through one winding do not pass through a second winding. In the case where adjacent phase windings are in close physical proximity, leakage flux and leakage inductance 127a may be relatively small. Likewise, in the case where respective phase windings are significantly spaced, leakage flux and leakage inductance 127a may be relatively high.

Inductance 127b is any inductance which is externally provided and is not provided by averaging transformer 223. Inductance 127b may be provided by an inductive component such as a power inductor, or it may be provided "parasitically" in connection with an interconnecting bus or wire, a printed circuit board trace, or any circuit element which provides the required inductance (one specific example is where the conductor which connects to averaging transformer summing port 133b is fed through a core (as seen by core 225 in FIG. 21) such as a magnetic toroid). In some cases, inductance 127a may be sufficiently high such that inductance 127b can be set to zero. In all cases, inductance 127 is defined as the sum of inductances 127a and 127b. Averaging transformer 223 and inductance 127b may be in close proximity or they may be relatively distant. In all cases, the combination of averaging transformer 223 and inductance 127b is referred to as magnetic element 121.

Figure 7:
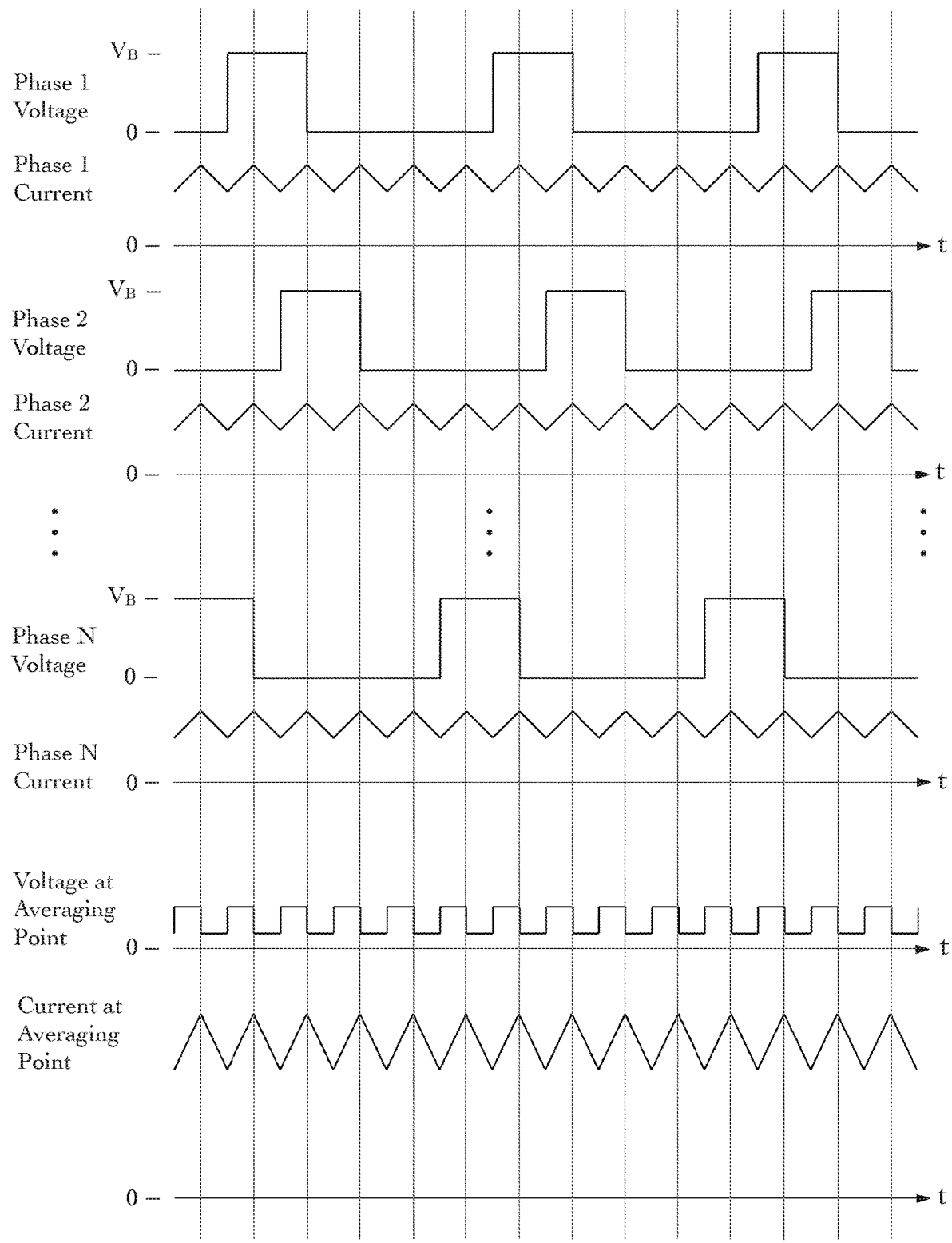
FIG. 7 is a timing diagram showing typical waveforms for the FIG. 6A polyphase regulator.

The FIG. 6A polyphase buck regulator includes controller 139, the primary function of which is to provide PWM signals at output 143 which drive high-side switching devices 145-x and low-side switching devices 147-x. In the preferred case, duty cycles are accurately matched and symmetrically distributed over the switching period, T, as shown in FIG. 7. Controller 139 comprises some type of signal processor such that input signals appearing at controller input 141 provide desired output signals at controller output 143. Controller input signals may include current sense signals generated by current sensors 135-x. In turn, these signals may be used to establish current-mode operation and/or to prevent magnetic saturation of averaging transformer 223. As used herein, designators which include the suffix "-x" represent the collection of designators which include -1, -2, - - - n.

Controller 139 may be used to carry out auxiliary functions such as reporting voltages, currents, temperatures, etc. to external systems. Where multiple regulators are involved, the number of controllers need not match the number of regulators. In some cases, controller 139 may be used to provide control signals (e.g. PWM signals) for external power components such as active rectifiers, inverters, and regulators.

It should be observed that as in the case of FIGS. 1 through 4 and 6A through 6C, first node 105 is common to both first port 101 and second port 103. In many cases, first node 105 may be the "common negative" for ports 101 and 103. However, in the case where semiconductor polarities have been reversed, first node 105 may be the "common positive".

In the case of high power systems, voltage differences across conductors may not be negligible due to resistive and inductive effects. In many cases, these "voltage drops" provide penalties such as increased temperature rise or reduced efficiency. However, in some cases, these effects can actually be beneficial—e.g., where current balancing between two parallel elements is desired. It is to be understood in connection with this disclosure that any such exploitation of "node parasitics" remains within the scope of the invention. As an example, first node 105 (see FIG. 6A) which may comprise a bus bar or circuit board trace may have sufficient resistance or inductance such that the voltage difference between conductors 101b and 103b is not negligible.

Figure 6B:
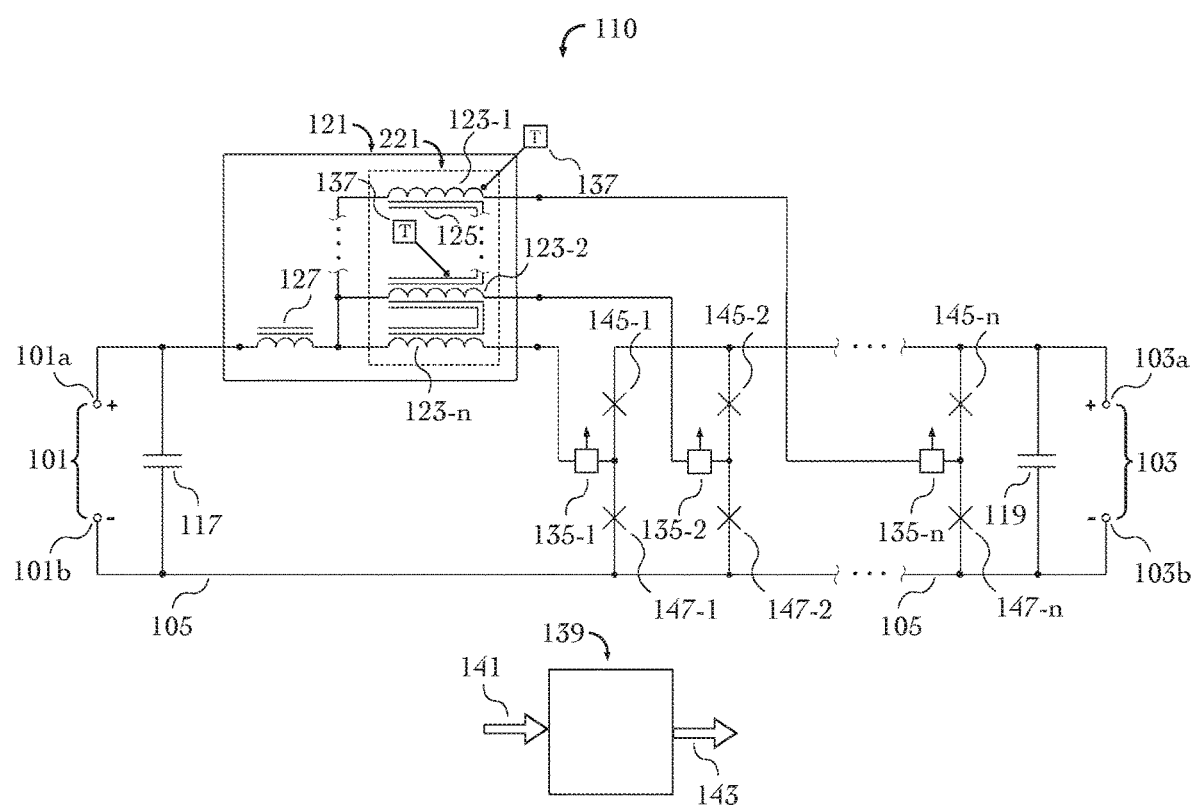
FIG. 6B is the block schematic for a polyphase boost regulator which includes a magnetic element containing an averaging transformer.

FIG. 6B is an embodiment of the invention which provides polyphase boost regulator 110 which may be unidirectional or bidirectional. For the unidirectional case, high-side devices 145-x are diodes, low-side devices 147-x are semiconductor switches, input power is applied to port 101, and output power is collected at port 103; output voltage/input voltage is equal to 1/(1−D), where D is the duty cycle associated with each low-side switch 147-x. For bidirectional operation, both low-side and high-side devices comprise semiconductor switches with diodes connected in parallel.

Figure 6C:
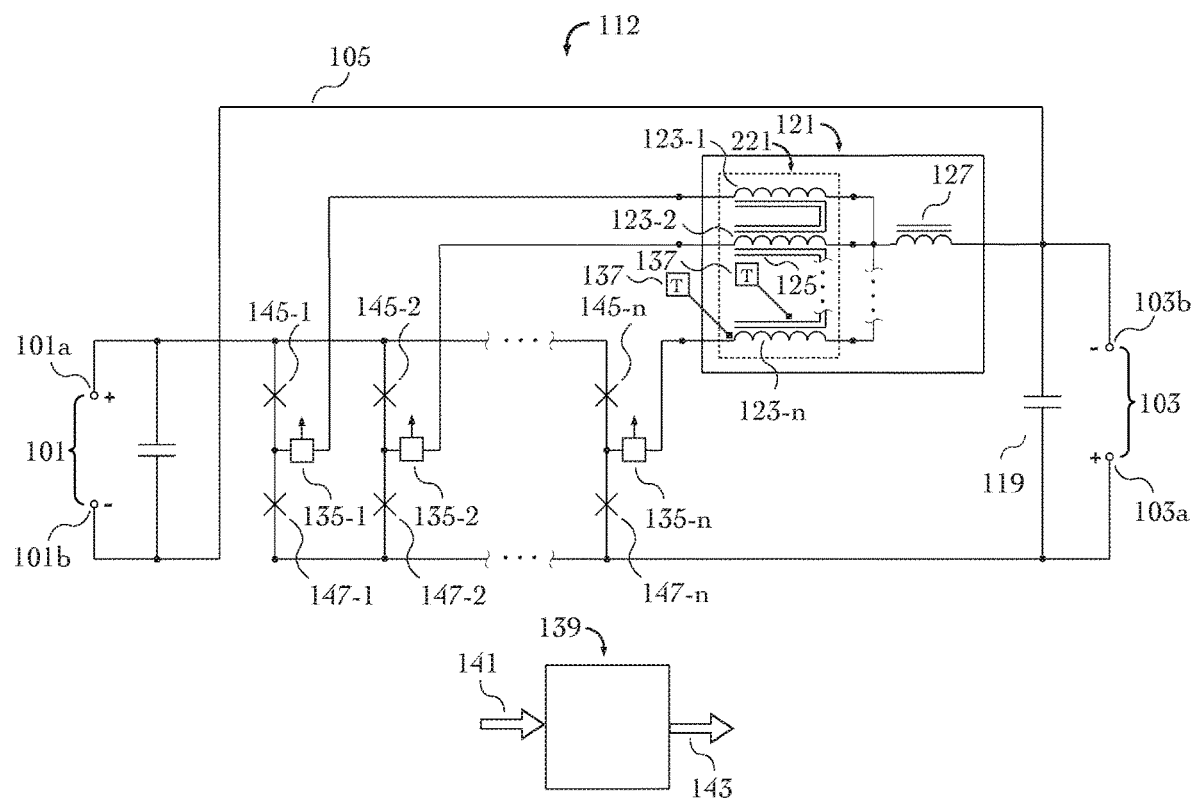
FIG. 6C is the block schematic for a polyphase flyback regulator which includes a magnetic element containing an averaging transformer.
Figure 6D:
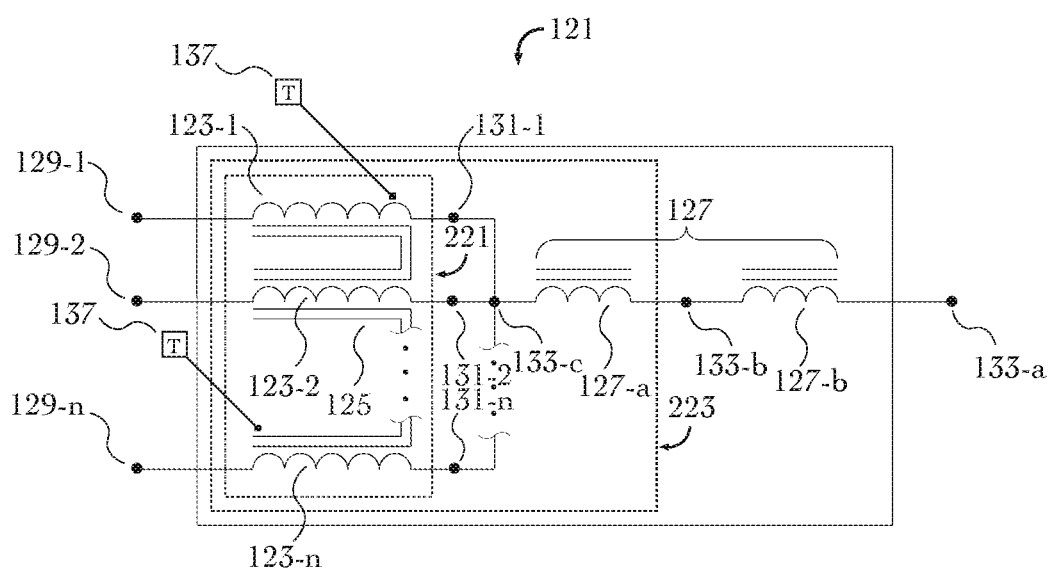
FIG. 6D is a diagram which shows details for the magnetic element used in FIGS. 6A, 6B, and 6C.

FIG. 6C is an embodiment of the invention which provides polyphase flyback regulator 112 which may be unidirectional or bidirectional. Two arrangements correspond to unidirectional power conversion. For the first arrangement, high-side devices 145-x are semiconductor switches, low-side devices 147-x are diodes, input power is applied to port 101, and output power is collected from port 103; output voltage/input voltage is equal to D/(1−D), where D is the duty cycle associated with each high-side switch 145-x. For the second arrangement, high-side devices 145-x are diodes, low-side devices 147-x are semiconductor switches, input power is applied to port 103, and output power is collected from port 101; output voltage/input voltage is equal to D/(1−D), where D is the duty cycle associated with each low-side switch 147-x. For bidirectional operation, both low-side and high-side devices comprise semiconductor switches with diodes connected in parallel. As with the previously discussed polyphase buck and boost topologies which use magnetic element 121, both size and power loss are reduced, while dynamics is improved, and for the same reasons.

FIG. 6D shows details of magnetic element 121 which is used in the regulators of FIGS. 6A, 6B, and 6C. Magnetic element 121 consists of two sub-elements: averaging transformer 221 and inductance 127. In turn, averaging transformer 221 comprises core 125 and windings 123-x. Core 125 may comprise a single element or may comprise multiple elements, where a first core element is not contiguous with a second core element. In most cases, either one or two windings 131-x are associated with each phase. Winding starts are at ports 129-x and winding finished join at ports 131-x. Ports 131-x join together to form node 133-c. The core is structured and the windings are interconnected such that the instantaneous voltage at node 133-c (referenced to a given point) is equal to the average of the n number of instantaneous voltages appearing at ports 129-x (referenced to the same point).

Inductance 127-a is the equivalent series inductance due to leakage flux within averaging transformer 221. This inductance is due to the fact that some flux lines which pass through a given winding do not pass through a second winding. Inductance 127-b is inductance which is not a result of averaging transformer 221. In some cases, inductance 127-b may be the result of an added component such as an inductor. In other cases, inductance 127-b may be due to parasitic effects associated with current conductors such as bus bars, wires, or circuit board traces. In all cases, the total effective series inductance is the sum of inductance 127-a and 127-b.

In many cases, averaging transformer 223 is a single element consisting of a single core and either n or 2*n number of windings. In other cases, two or more separate transformers may be interconnected to form averaging transformer 223.

In most cases, the material used for core 125 should have high relative permeability—such that magnetizing currents are minimized. Core losses should be as low as possible such that losses are minimized, while core saturation flux density should be as high as possible such that size can be minimized.

It should be noted that numerous embodiments of averaging transformer 223 and magnetic element 121 are possible, and that those shown subsequently do not represent an exhaustive list.

One of the most common power processing applications is where single phase or polyphase AC is converted into regulated DC. This application is germane to DC power supplies, battery chargers, industrial processes such as electroplating and aluminum production, and electric railway power systems—to mention but a few. By combining an AC to DC converter (e.g., conventional diode rectifier, thyristor rectifier, active rectifier, sub-phase active rectifier, electronic system with multiple conversion links, or electromechanical AC to DC converter) with any of the regulators described above, a power dense, low cost solution with fast dynamic response can be provided for the above need. With appropriate control of the regulator element, unity or near unity power factor can be achieved at the AC input. By using the polyphase approach, voltage spiking associated with conductor inductance can be greatly reduced as switch currents are reduced by a factor of n. This in turn can enable the use higher speed switching devices such that switching frequencies can be increased while switching losses are reduced. Finally, due the fact that polyphase switching "spreads switching events over time", emi can be significantly reduced.

Specifically, by combining a rectifier or AC to DC converter with regulators 108, 110, or 112, conversion of AC power to controlled DC power becomes possible. (As used herein, a rectifier or an AC to DC converter is any device which converts an AC input voltage to a DC output voltage; this includes semiconductor devices as well as electromechanical devices.)

Figure 8:
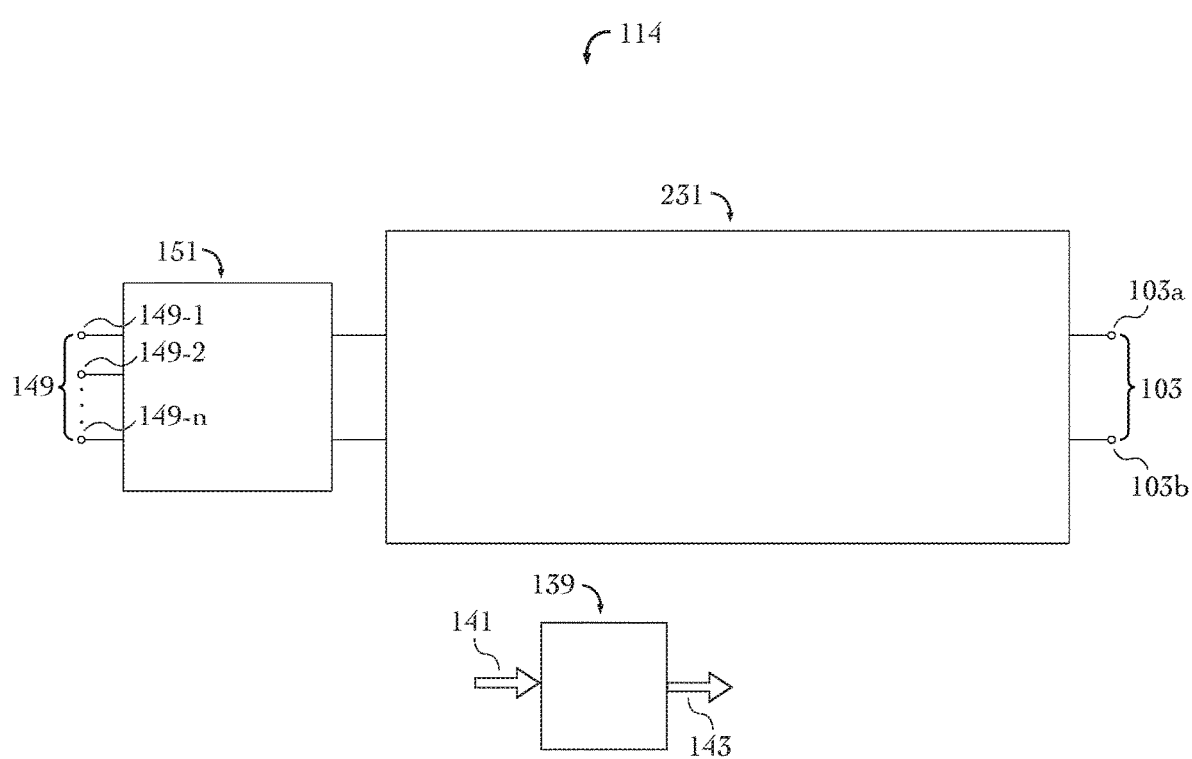
FIG. 8 is an AC to DC converter which comprises an AC to DC converter and the switching regulator of either FIG. 6A, FIG. 6B, or FIG. 6C.

FIG. 8 is an embodiment of the invention where AC to DC converter 151 is combined with polyphase regulator 231 to provide regulated AC to DC converter 114. Several embodiments of AC to DC converter 151 are identified and shown in FIGS. 9A through 9D. Likewise, several embodiments of polyphase regulator 231 are identified which include polyphase buck regulator 108 of FIG. 6A, polyphase boost regulator 110 of FIG. 6B, and polyphase flyback regulator 112 of FIG. 6C. It should be noted that each of these regulators uses magnetic element 121. For some embodiments of AC to DC converter 151, bidirectional as well as unidirectional versions are possible. In a bidirectional version, the AC to DC converter 151 (as illustrated in FIG. 8) may be capable of transmitting power from left to right and it may also be capable of transmitting power from right to left (in which case the AC to DC converter 151 may convert DC to AC). For each embodiment of polyphase regulator 231, both unidirectional and bidirectional versions are possible. It should be noted that all combinations of AC to DC converter 151 and polyphase regulator 231 are embodiments of regulated AC to DC converter 114.

Figure 9A:
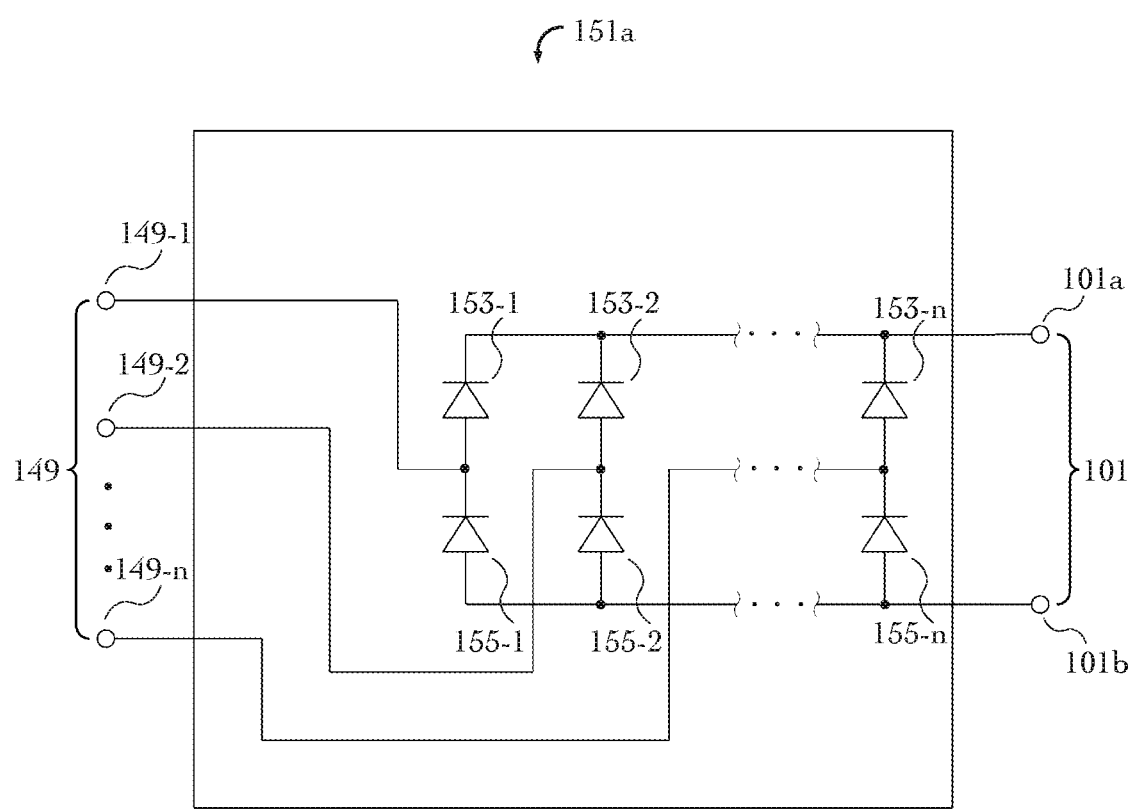
FIG. 9A is an AC to DC converter comprising a diode bridge which is provides the AC to DC converter used in FIG. 8.

FIG. 9A is AC to DC converter 151a comprising port 149, high-side diodes 153-x, low-side diodes 155-x, and first port 101. As n, the number of phases is increased, output ripple voltage is reduced while ripple frequency is increased—providing benefit for regulator 231. It should be noted that more complex diode embodiments of AC to DC converter 151a are possible (e.g. various delta-wye configurations)—which are within the scope of this invention).

Figure 9B:
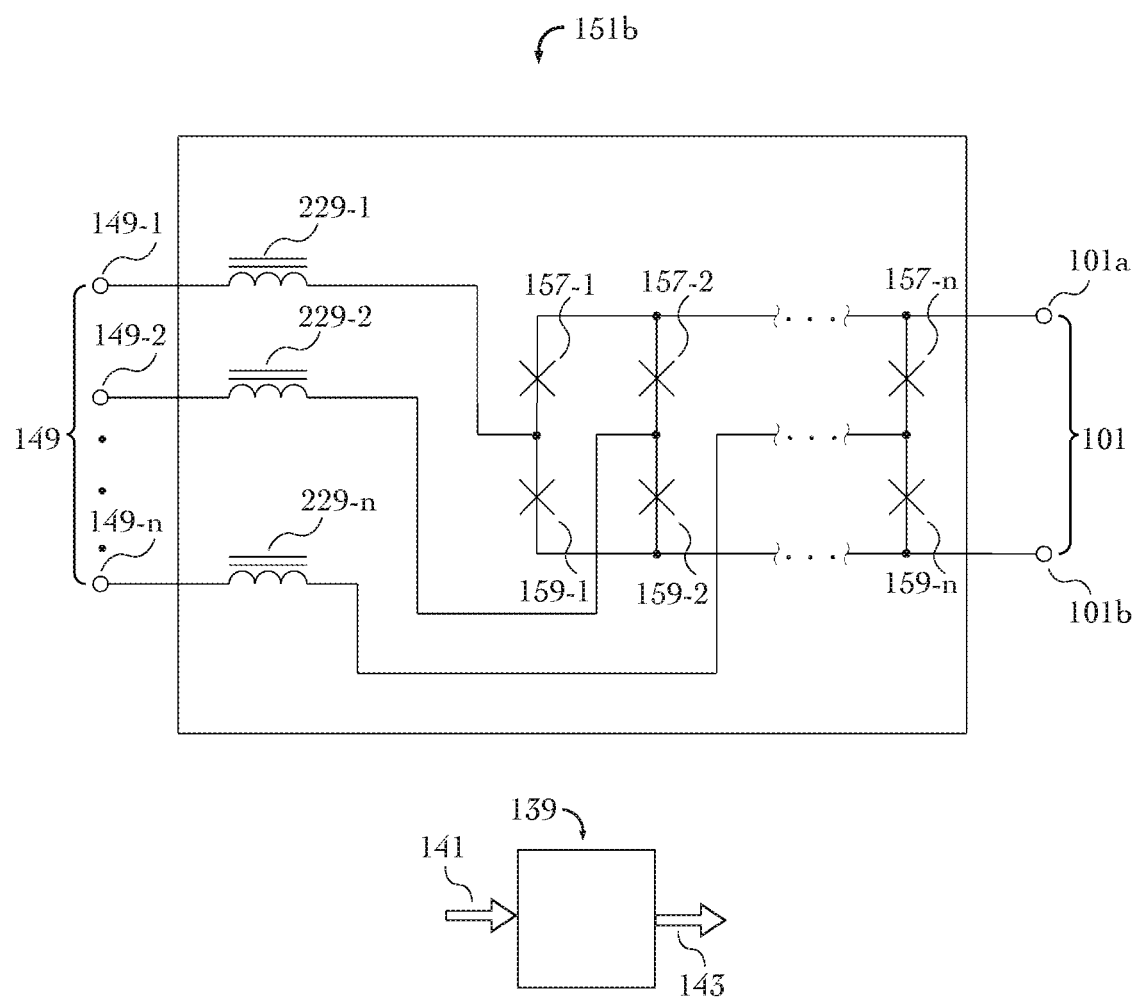
FIG. 9B is an AC to DC converter comprising an active rectifier which is provides the AC to DC converter used in FIG. 8.

In FIG. 9B, AC to DC converter 151b is an active rectifier comprising AC to DC converter port 149, port inductors 229-x, high-side rectifier switches 157-x, low-side rectifier switches 159-x, and first port 101. In turn, both high-side switches 157-x and low-side 159-x may be MOSFETs, IGBTs with parallel connected diodes, or other semiconductor switching devices. The controller for high-side switches 157-x and low-side switches 159-x is not shown. This controller may be a dedicated controller or may be provided by a controller associated with other circuit elements such as controller 139 which is part of regulator 231. Active rectifier 151b is inherently bidirectional and can provide both leading and lagging reactive power at port 149. Active rectifier 151b can also provide harmonic compensation with appropriate control.

Figure 9C:
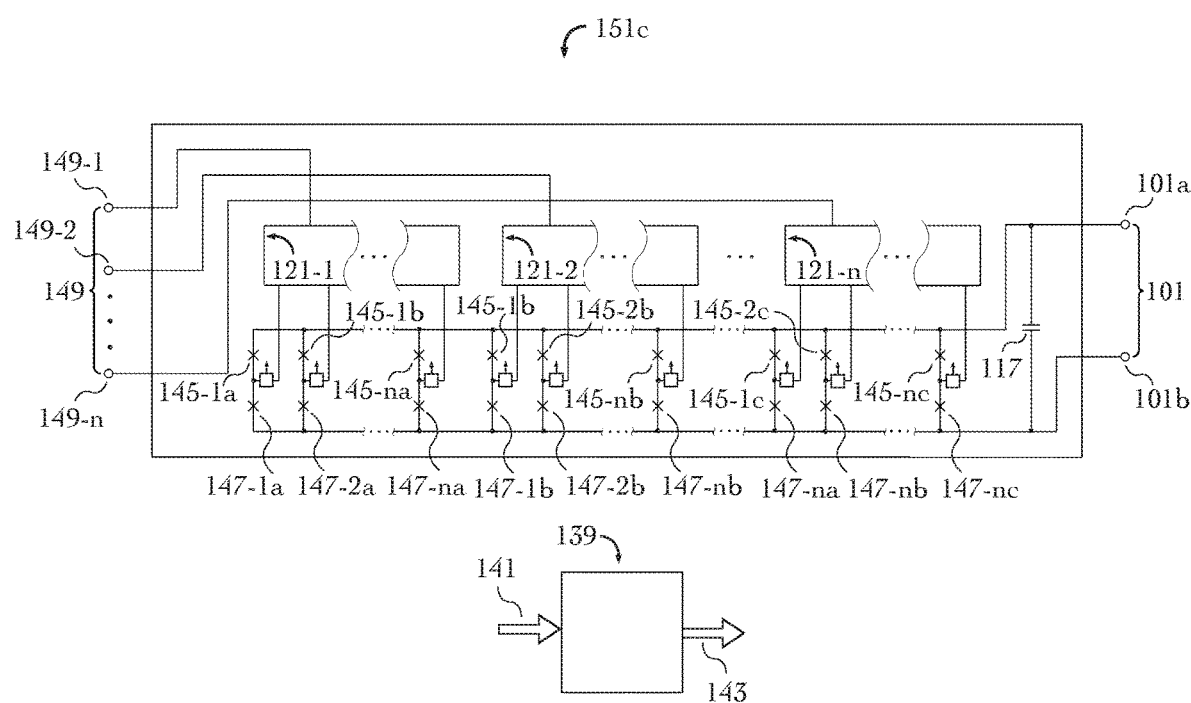
FIG. 9C is an AC to DC converter comprising an active rectifier which comprises sub-phases and the magnetic element of FIG. 6d.

In FIG. 9C, AC to DC converter 151c is an active rectifier, where at least one phase utilizes sub-phases and magnetic element 121. The number of sub-phases associated with each line phase need not be equal. Magnetic element 121-x is associated with the jth phase. The AC to DC converter 151c includes a plurality of switching poles, each including a high-side switch 145-xk and a low-side switch 147-xk. High-side switches 145-xk are associated with the $k^{th}$ sub-phase of the $j^{th}$ phase. Likewise, low-side switches 147-xk are associated with the $k^{th}$ sub-phase of the $j^{th}$ phase. Active rectifier 151c is inherently bidirectional and can provide both leading and lagging reactive power at port 149. Active rectifier 151c can also provide harmonic compensation with appropriate control.

Figure 9D:
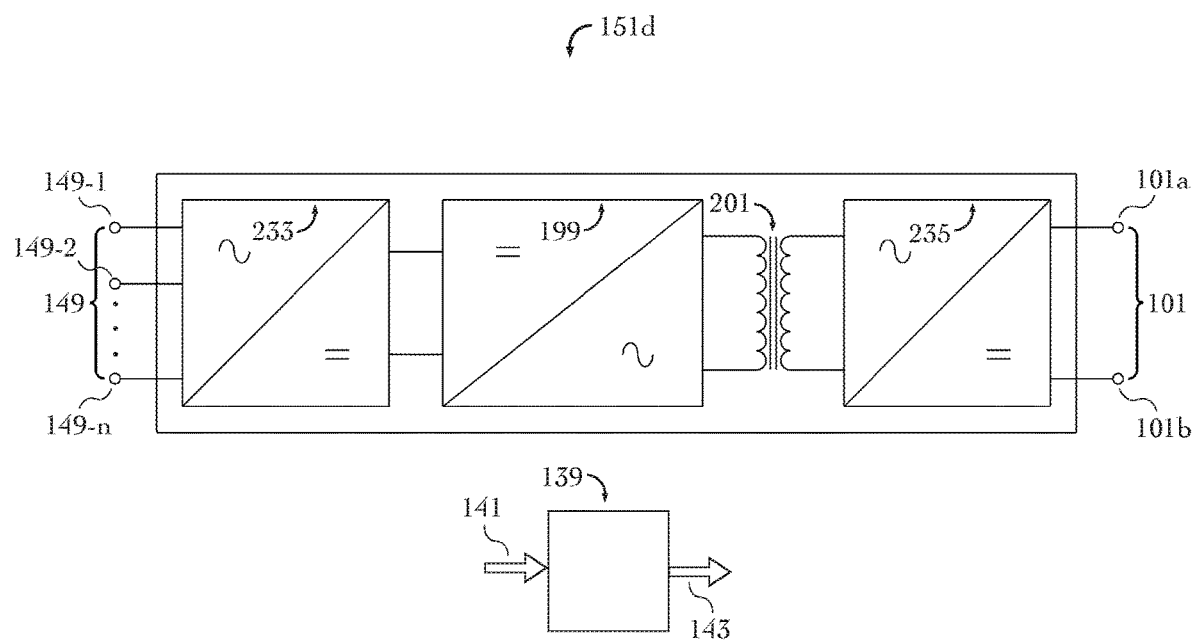
FIG. 9D is an AC to DC converter which includes galvanic isolation

In FIG. 9D, AC to DC converter 151d is an isolated AC to DC converter comprising AC to DC converter port 149, input rectifier 233, inverter 199, high frequency transformer 201, high frequency rectifier 235, and first port 101. In turn, line rectifier 233 may comprise a diode bridge or an active rectifier. In the case where line rectifier 233, inverter 199, and high frequency rectifier 235 are each bidirectional, AC to DC converter 151 may also be bidirectional. In this case, it can provide both leading and lagging reactive power at port 149, and can also provide harmonic compensation with appropriate control.

Figure 9E:
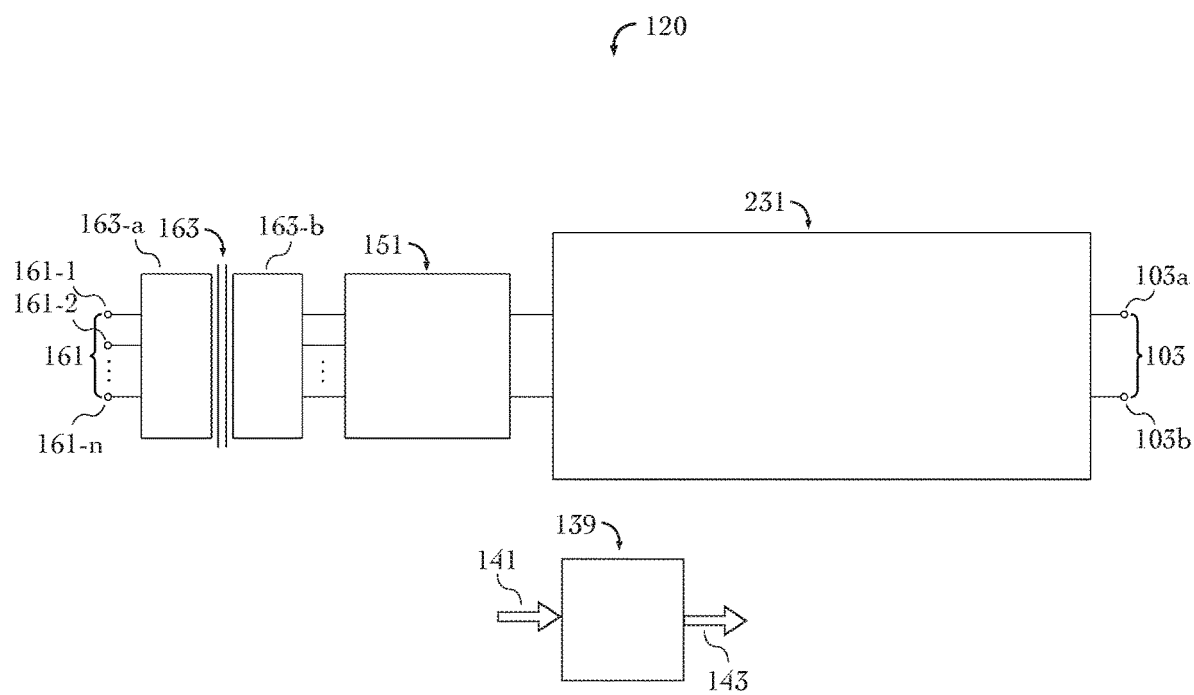
FIG. 9E is an AC to DC converter which includes a transformer, a first AC to DC converter, and a polyphase switching regulator which in turn contains the magnetic element of FIG. 6D.

FIG. 9E is an embodiment of the invention where transformer port 161, transformer 163, AC to DC converter 151, and regulator 231 are combined to provide isolated AC to DC converter 120. In turn, AC to DC converter 151 may comprise n-phase rectifier 151a, active rectifier 151b, AC to DC converter 151c, or AC to DC converter 151d. Likewise, regulator 231 may comprise buck regulator 110, boost regulator 112, or flyback regulator 112. With the addition of transformer 163, step-down or step-up operation is possible, as well as galvanic isolation. Transformer primary 163-a connects to an AC source, while transformer secondary 163-b connects to AC to DC converter 151.

Figure 9F:
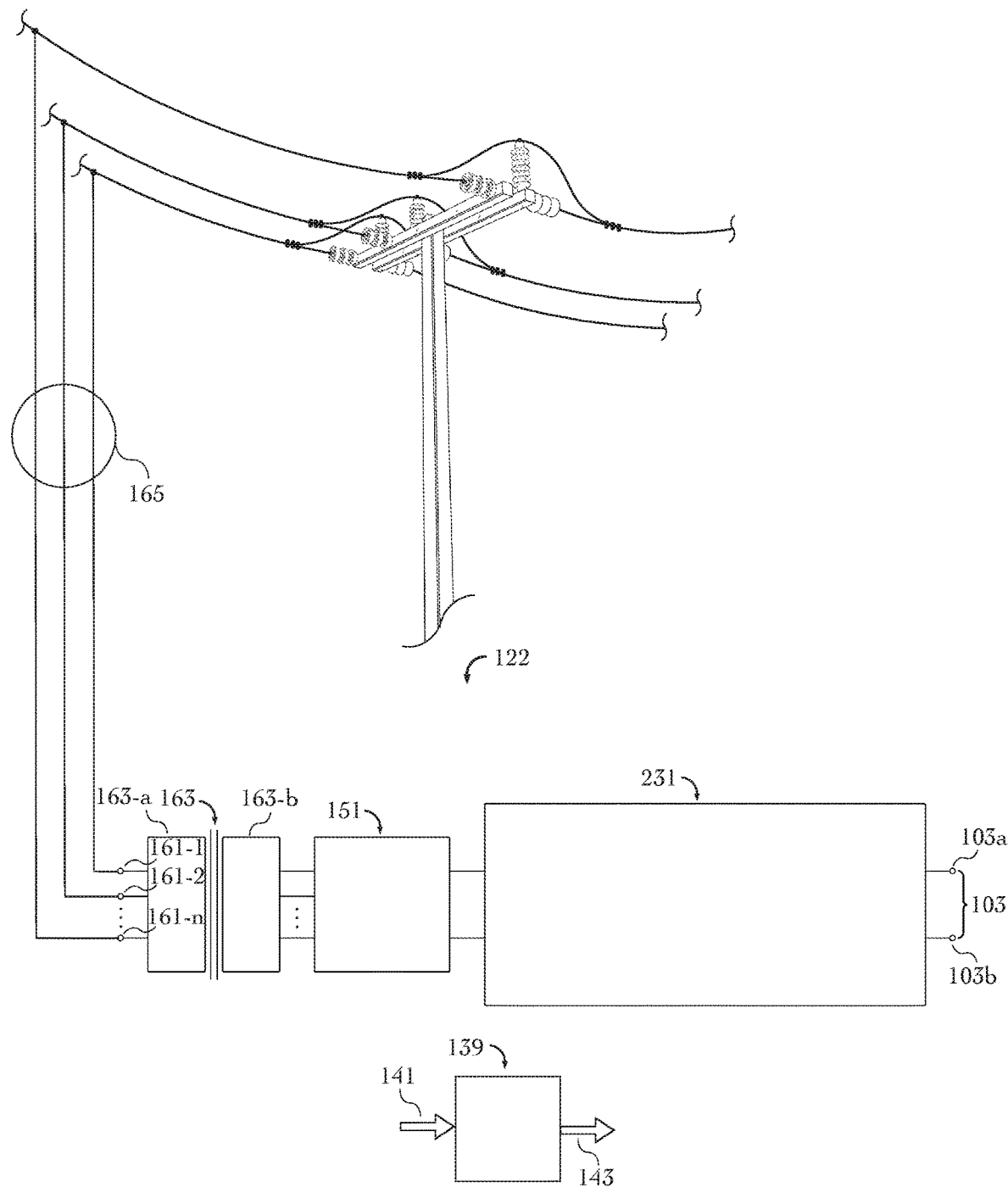
FIG. 9F is an AC to DC converter which includes a medium voltage utility interface, a medium voltage transformer, an AC to DC converter and a polyphase switching regulator which in turn contains the magnetic element of FIG. 6D.

The FIG. 9F embodiment of the invention provides medium voltage, isolated AC to DC converter 122, which is similar to that of FIG. 9E, but where transformer 163 is a medium voltage transformer and transformer port 161 connects to a medium voltage utility interface via medium voltage utility interface 165. It should be noted that for many applications, transformer 163 may be present as part of the electric utility. As such, the FIG. 9F configuration provides galvanic isolation for DC port 103 without the need for additional hardware, such as a second line frequency transformer or a high-frequency link (inverter-transformer-rectifier). This, in turn saves cost, reduces power loss, and improves system reliability. In most cases, AC to DC converter 151 is either a diode bridge or an active rectifier. However, in some cases, AC to DC converter 151 may include galvanic isolation provided for example by a high-frequency isolation link or a line frequency transformer (see FIG. 9D). The FIG. 9F embodiment may be used as an electric vehicle charger, where the vehicle battery is effectively connected to port 103 during recharge (see FIG. 10).

Figure 9G:
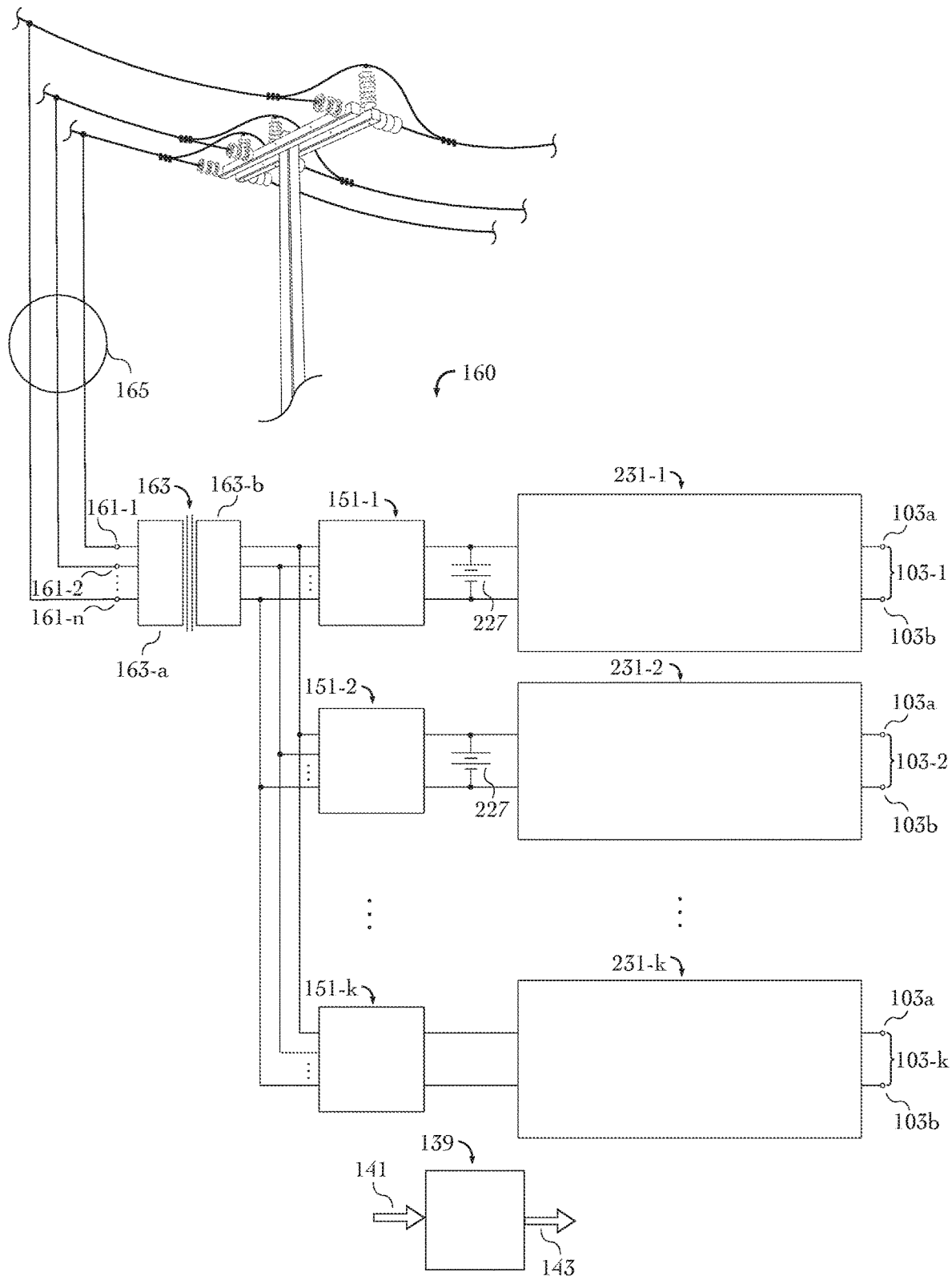
FIG. 9G is an AC to DC converter which includes a medium voltage utility interface, a medium voltage transformer, a plurality of AC to DC converters and a plurality of polyphase switching regulators.

The FIG. 9G embodiment of the invention provides multi-port medium voltage, isolated AC to DC converter 160, which is similar to that of FIG. 9F, but where multiple AC to DC converters 151-x connect to multiple respective regulators 231-x such that respective outputs 103-x are provided. Additionally, one or more regulators 231-x may have an energy storage battery 227-x connected across input port 101-x as shown. In the case where an energy storage battery is used, the associated AC to DC converter 151-x may be active (e.g., using transistors as opposed to diodes) and bidirectional such that the battery can be charged and discharged (e.g., returning power to the electric utility) in a controlled manner. The charge and discharge of battery 227-x may be independent of power flow(s) associated with regulators 231-x. With this scheme, all energy flow paths (e.g., each flow path between (i) the electric utility, (ii) any of the batteries 227, and (iii) any of the ports 103-x) are possible in the case where both the AC to DC converters and the regulators are each bidirectional. For example, the energy storage battery associated with regulator 231-1 may be be used to provide power to any of the regulators 231-x.

The FIG. 9G scheme provides galvanic isolation between ground and the electric utility for all ports 103-x and for each energy storage battery 227-x, but does not provide mutual isolation between ports 103-x and energy storage battery 227-x. The FIG. 9G embodiment may be used as a multi-port electric vehicle charger, where vehicle batteries effectively connect to ports 103-x during recharge (see FIG. 10).

Figure 9H:
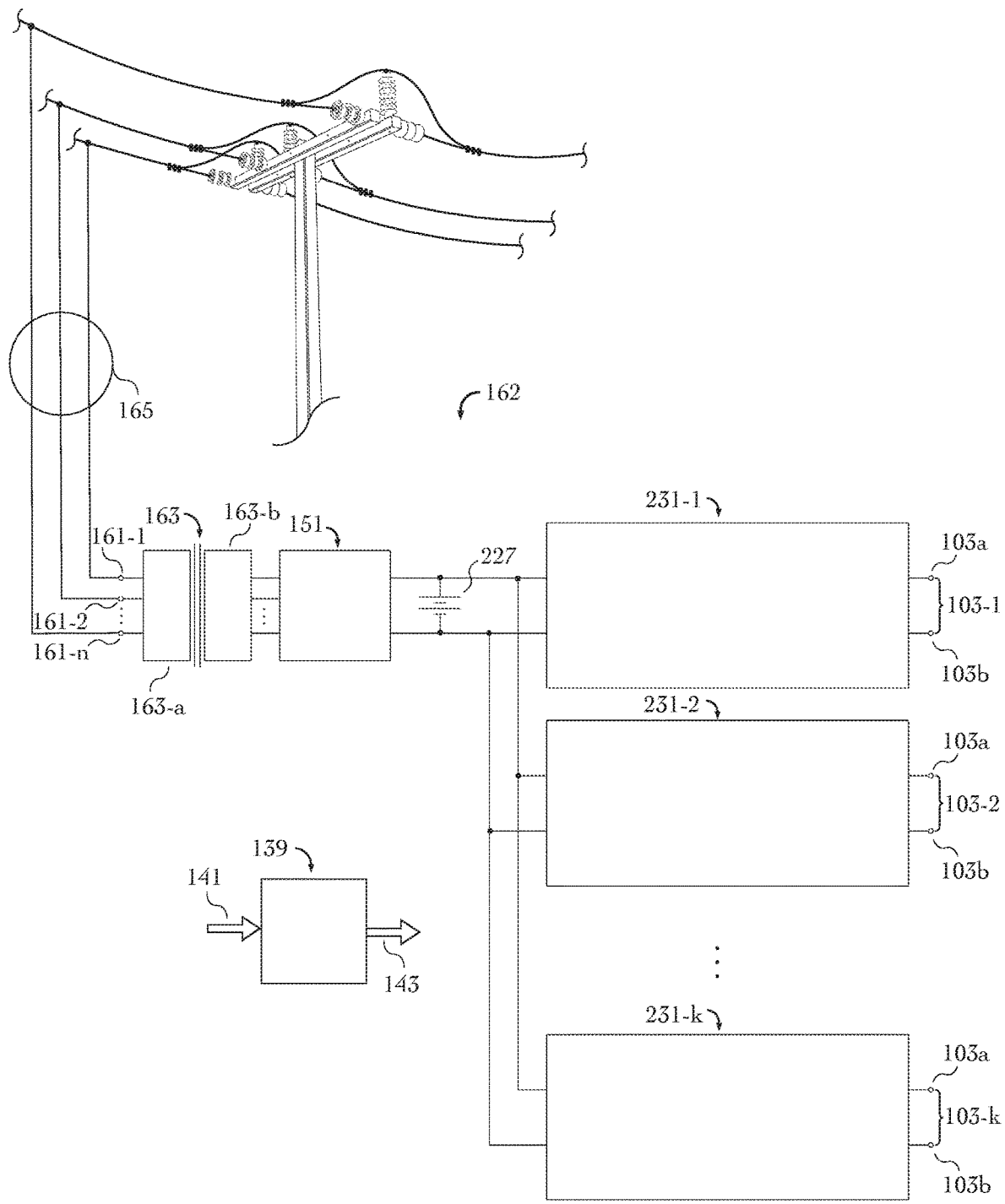
FIG. 9H is an AC to DC converter which includes a medium voltage utility interface, a medium voltage transformer, an AC to DC converter and a plurality of polyphase switching regulators.

The FIG. 9H embodiment of the invention provides multi-port medium voltage, isolated AC to DC converter 162, which is similar to that of FIG. 9G, but where a single, common AC to DC converter 151 connects to multiple regulators 231-x such that respective outputs 103-x are provided. A single energy storage battery 227 may connect across the common DC bus which connects to regulator input ports 101-x. In the case where battery 227 is connected, AC to DC converter 151 may be active and bidirectional such that battery 227 can be charged and discharged in a controlled manner. The FIG. 9H embodiment may be used as a multi-port electric vehicle charger, where vehicle batteries effectively connect to ports 103-x during recharge (see FIG. 10).

Figure 10:
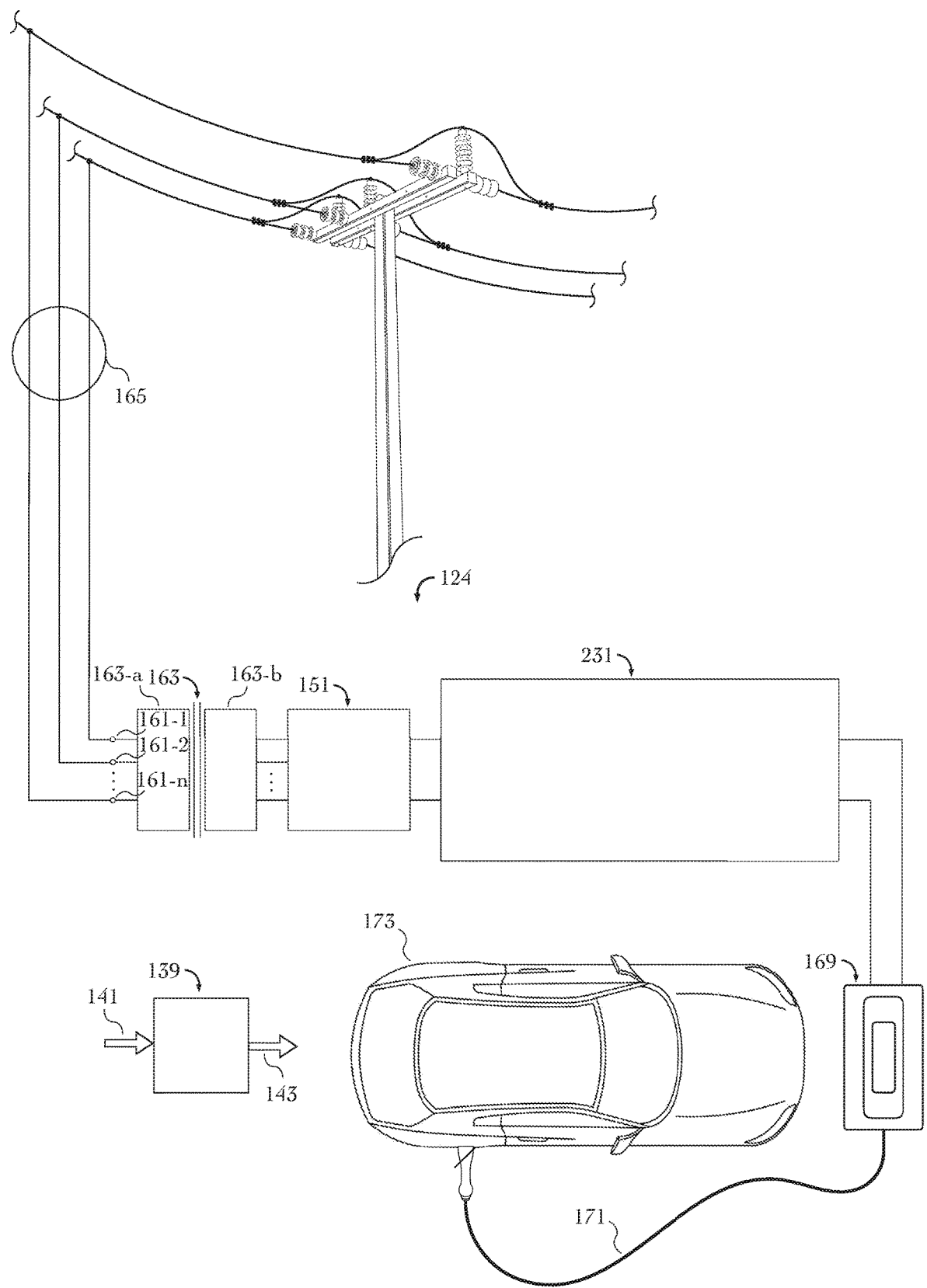
FIG. 10 is an electric vehicle recharge system which includes a medium voltage utility interface, a medium voltage transformer, an AC to DC converter, a polyphase switching regulator, which in turn contains the magnetic element of FIG. 6D, and a charger dispenser.

The FIG. 10 embodiment of the invention provides vehicle recharge system 124, which is similar to that of FIG. 9F, but where regulator port 103 connects to charge dispenser 169 via interconnect lines 167a and 167b. In turn recharge dispenser 169 connects via recharge cable 171 to battery vehicle 173 to provide recharge. It should be noted that AC to DC converter 151, regulator 231, and charge dispenser 169 may be co-packaged as a single unit.

In the case of the FIG. 10 embodiment, signals applied to the controller input (not shown) may comprise internal signals such as current and voltage sense signals generated within recharge system 124; they may also include signals which are generated from within battery vehicle 173, such as charge rate commands or charge state limits, and they may also include externally generated signals such as those from the electric utility. Output signals generated by the controller include PWM signals which are applied to switching devices 145-$x$ and 147-$x$; output signals may also include representations for sensed parameters such as voltages, currents, temperatures, system status, and the like.

In the case where AC to DC converter 151 and regulator 231 are both bidirectional, "vehicle to grid operation" may be possible such that battery energy can be returned to the electric utility. With the vehicle to grid approach, charger power may be partly controlled through communication with the electric utility. As such, energy storage within the vehicle can be called upon by the electric utility to compensate for load and generation variations. This, in turn, can enable utilities to better handle the increasing use of wind and solar generators which are inherently variable.

Figure 11A:
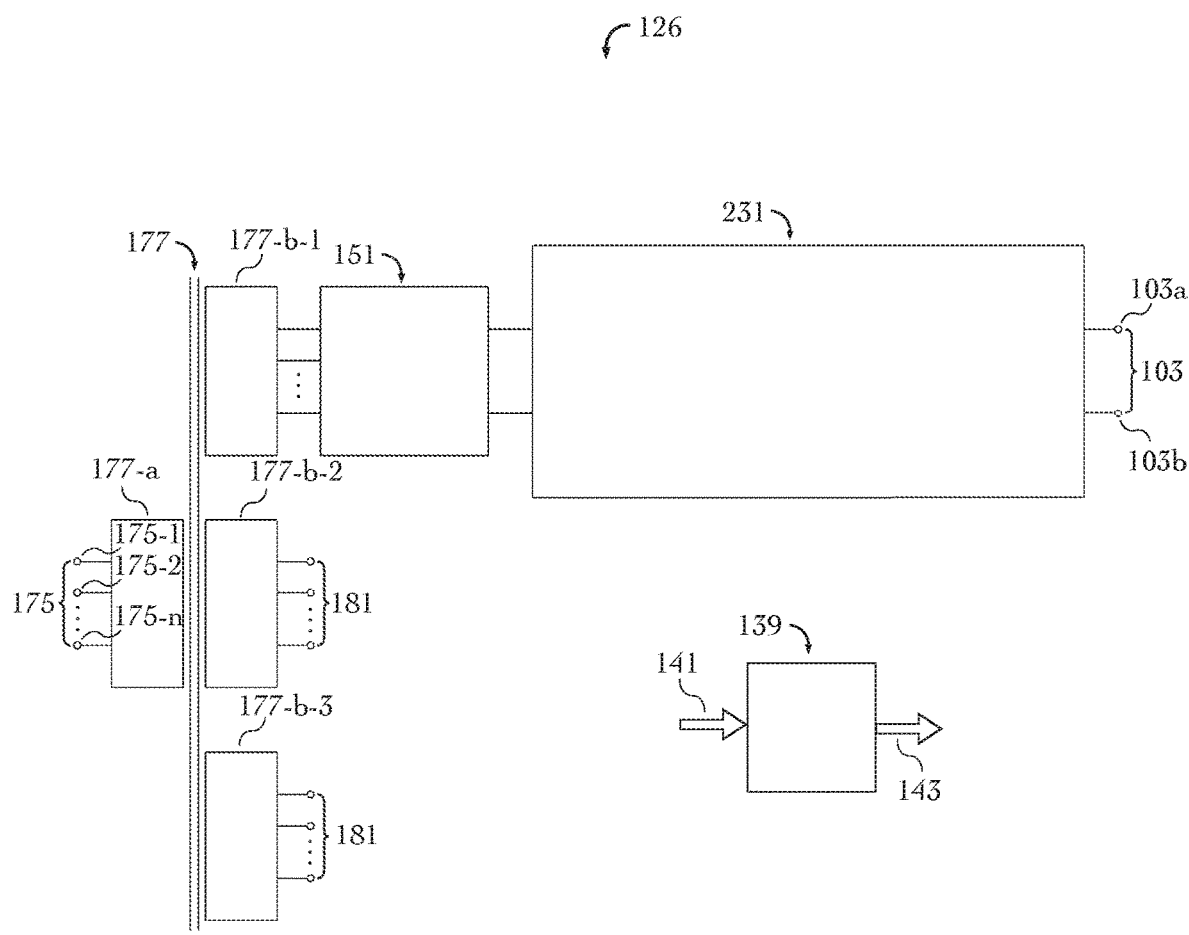
FIG. 11A is an AC to DC converter with AC ports which includes a transformer, a first AC to DC converter, and a polyphase switching regulator, which in turn contains the magnetic of FIG. 6D.

FIG. 11A is an embodiment of the invention which provides isolated AC to DC/AC converter 126, where transformer port 175, multi-winding transformer 177, AC to DC converter 151, and polyphase switching regulator 231 are combined to provide regulated DC port 103 and one or more unregulated AC ports 181. Transformer windings are shown as three phase, but may be single phase or greater than three phase. Regulator 231 may be unidirectional or bidirectional. In the case where both AC to DC converter 151 and regulator 231 are bidirectional, DC port 103 may be bidirectional and can thereby serve as both an output and an input.

Figure 11B:
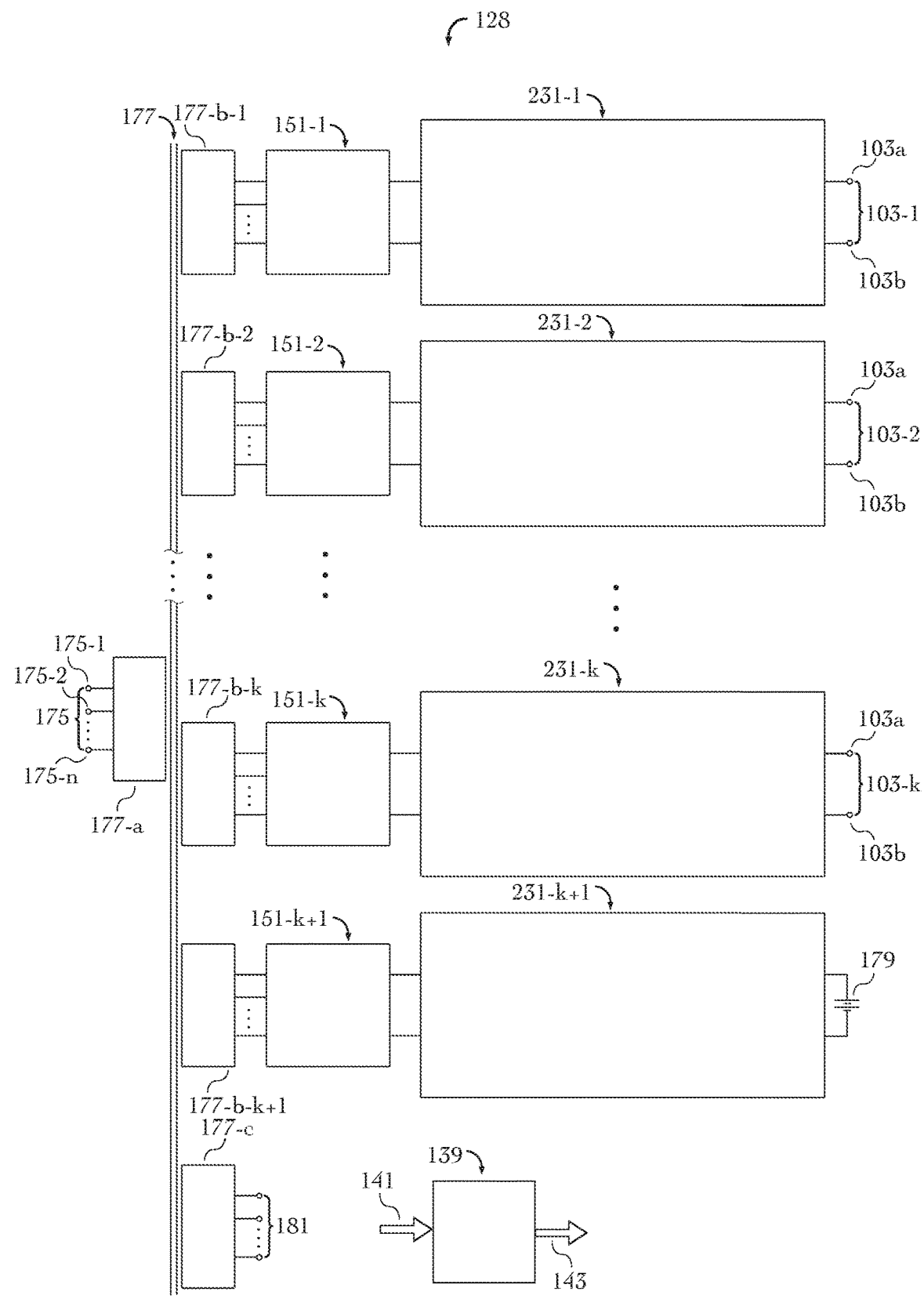
FIG. 11B is a power system with energy storage, which includes a transformer, at least one DC port, any number of AC ports, at least two AC to DC converters, at least two polyphase switching regulators, where at least one contains the magnetic element of FIG. 6D, and an energy storage battery.

FIG. 11B is an embodiment of the invention which provides isolated AC to DC converters with energy storage 128 comprising transformer port 175, multi-winding transformer 177, k number of AC to DC converters 151-$x$, k number of polyphase regulators 231-$x$, one bidirectional regulator 231-$k$+1, energy storage battery 179, and any number of AC ports 181. In turn, each AC to DC converter 151-1 through 151-$k$ and each polyphase regulator 231-1 through 231-$k$ may be either unidirectional or bidirectional. Both AC to DC converter 151-$k$+1 and polyphase regulator 231-$k$+1 are bidirectional such that energy storage battery 179 can be recharged from utility power applied to transformer port 175, from power applied at any bidirectional DC port 103-$x$, or from power applied to any AC port 181. Likewise, energy stored within energy storage battery 179 can be returned to transformer port 175, any port 103, or any AC port 181. It should be understood that each regulator may be a buck, a boost, or a flyback regulator and that the number of phases associated with each regulator need not be equal. It should also be understood that only one of the regulators need be a polyphase regulator which uses magnetic element 121. Finally, it should be noted that transformer 177 may be single phase, three-phase, or greater than three phase. The transformer primary is designated by 177-$a$. Transformer secondaries 177-$b$–1 through 177-$b$-$k$ are associated with DC ports 103-1 through 103-$k$, and secondary 177-$b$-$k$+1 is associated with energy storage, while secondary 177-$c$-$x$ is associated with ac port(s) 181.

Figure 11C:
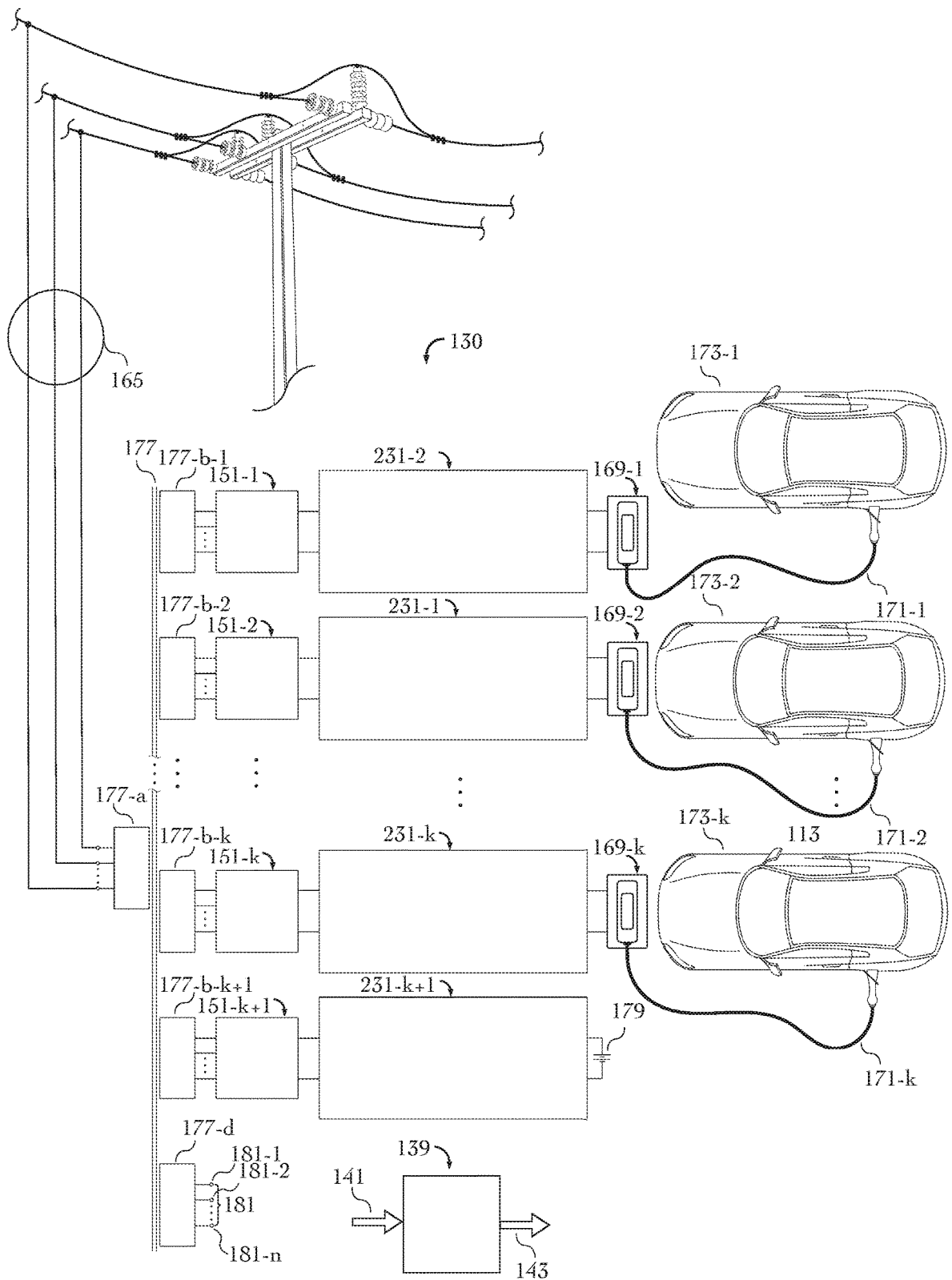
FIG. 11C is a multi-port electric vehicle recharge and energy storage system which includes a medium voltage utility interface, a medium voltage transformer, at least two AC to DC converters, at least two polyphase switching regulators, where at least one contains the magnetic of FIG. 6D, an energy storage battery, and at least one charger dispenser.

FIG. 11C is an embodiment of the invention which provides multi-port recharge and energy storage system 130, where up to k number of battery vehicles 173-$x$ can be recharged from an AC utility source and where stored energy can exchange with both the vehicles, the electric utility, and any AC port 181. Elements include medium voltage utility interface 165, medium voltage transformer 177, AC to DC converters 151-$x$, regulators 231-$x$, energy storage battery 179, charge dispensers 169-$x$, and recharge cables 171-$x$. At least one regulator includes a magnetic element 121. AC to DC converter 151-$k$+1 and regulator 231-$k$+1 (which interfaces with the energy storage battery) may both be bidirectional. Transformer 177 may also include additional windings such that one or more AC power ports 181 may be provided. The energy storage function is provided by transformer secondary 177-$b$-$k$+1, AC to DC converter 151-$k$+1 and energy storage battery 179. The FIG. 11C configuration enables galvanic isolation such that each vehicle is galvanically isolated from ground as well as being isolated from each other.

Figure 12:
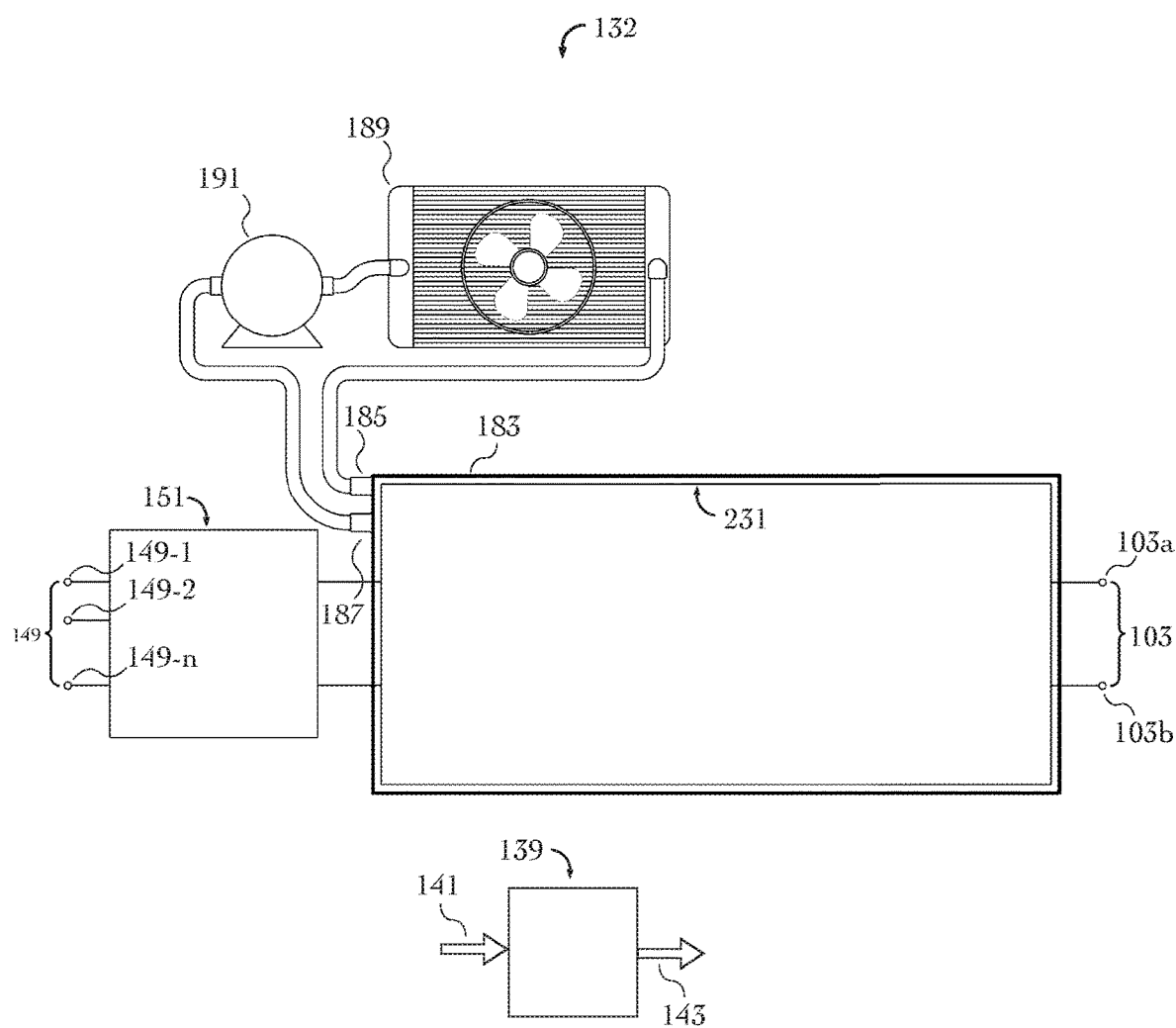
FIG. 12 is an AC to DC converter which includes an AC to DC converter and a polyphase switching regulator, which in turn contains the magnetic element of FIG. 6D, and where heat generated within the polyphase regulator is removed by a cooling system.

FIG. 12 is an embodiment of the invention which provides AC to DC converter with cooling system 132, where AC to DC converter 151 and polyphase regulator 231 are combined with a liquid cooling system to provide heat removal from components within these two elements. As such, heat may be removed from magnetic element 121, high-side devices 157-$x$, low-side switches 159-$x$ and other components such as semiconductors inductors, etc. The cooling system consists of fluid pump 191, radiator 189, heatsink 183 (which may be integral with magnetic element 121), inlet 185 and outlet 187. The cooling system may be integrated with other cooling elements such as those used to cool power semiconductors, motors, batteries, etc. While FIG. 12 comprises regulator 231, the cooling system embodiment applies to any configuration which includes magnetic element 121.

Figure 13:
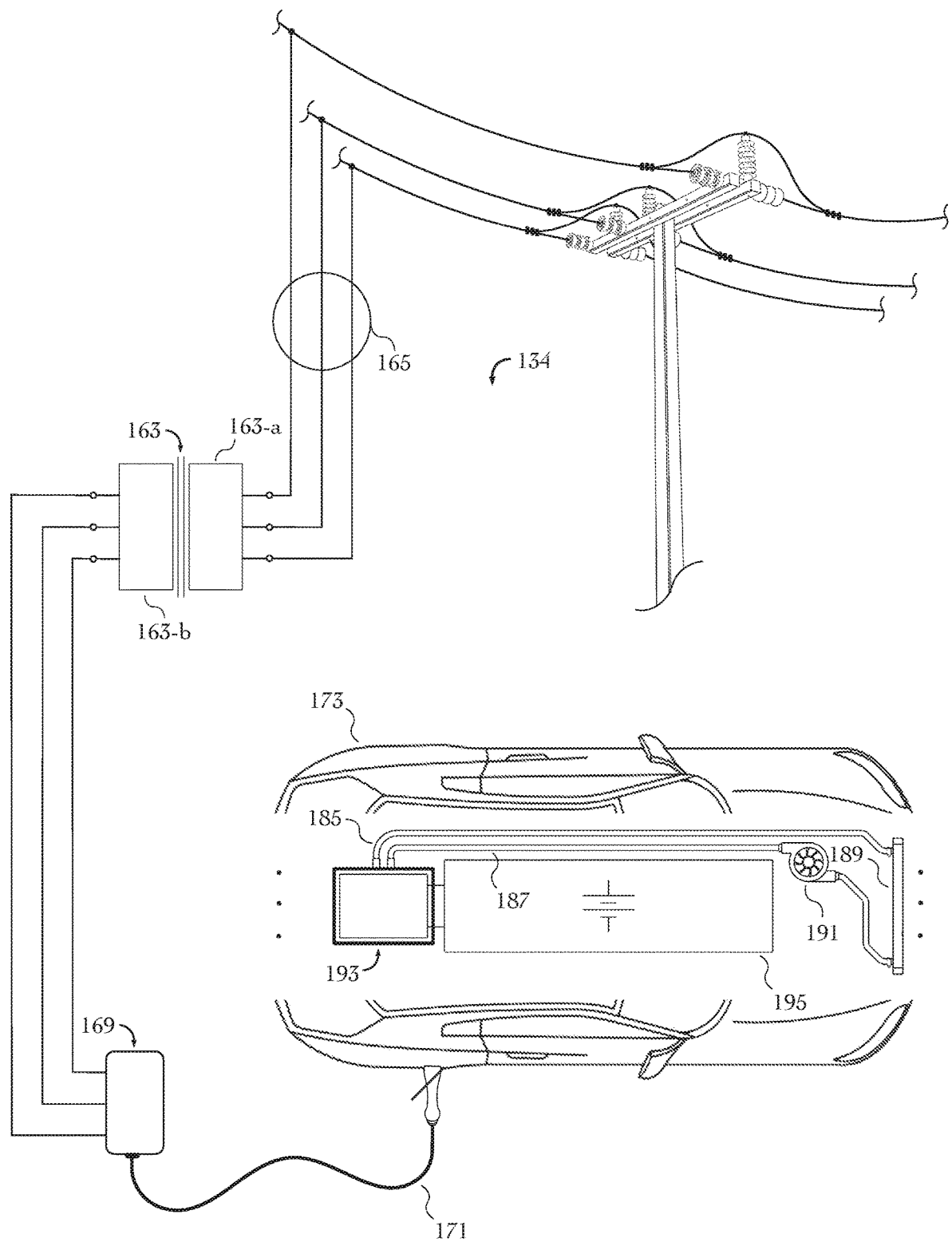
FIG. 13 is an on-board electric vehicle charging system which includes an off-board medium voltage transformer, an on-board polyphase switching regulator, which in turn contains the magnetic element of FIG. 6D, and a charger dispenser.

FIG. 13 is an embodiment of the invention which provides on-board recharge system 134, where AC to DC converter 151, regulator 231, and associated cooling elements are part of on-board charger 193 which is contained within battery vehicle 173. Elements of the embodiment include medium voltage utility interface 165, medium voltage transformer 163, charge dispenser 169, charge cable 171, battery vehicle 173, vehicle battery 195, heatsink 183, fluid pump 191, radiator 189, inlet 185, and outlet 187. Vehicle battery 195 and associated components may be galvanically isolated from the electric utility by action of transformer 163 which is typically off-board.

Figure 14:
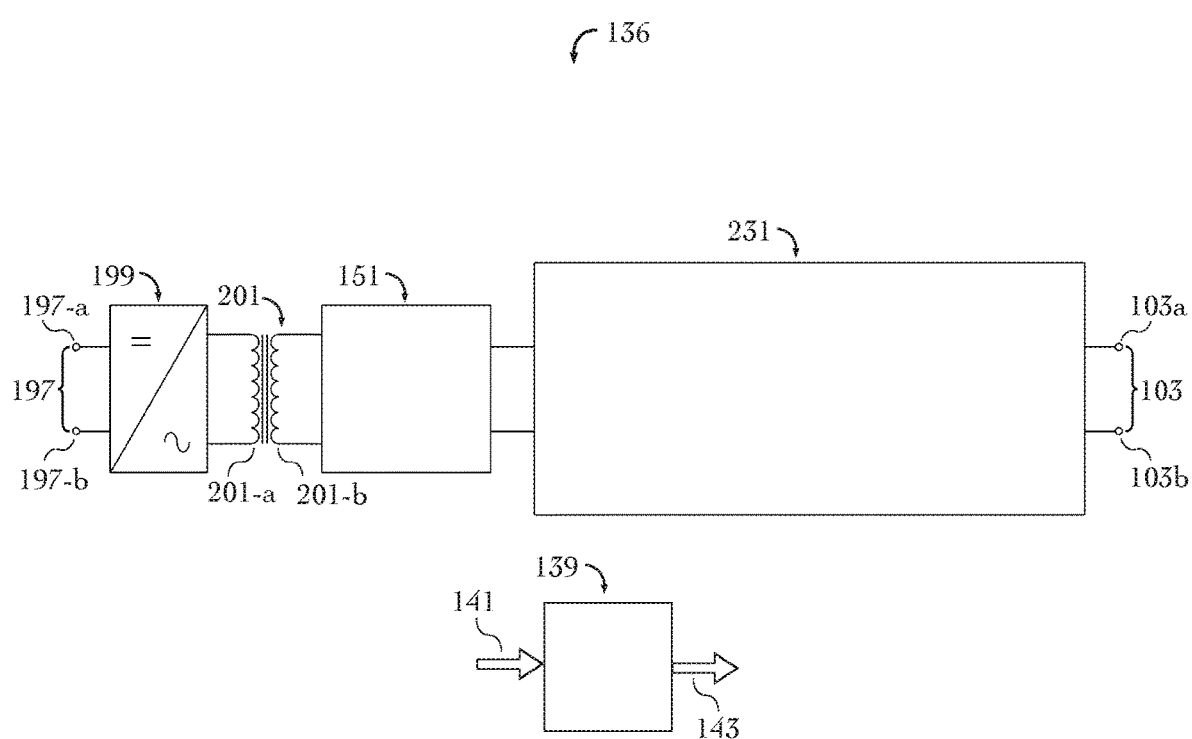
FIG. 14 is a DC to DC converter which includes an inverter, a transformer, an AC to DC converter, and a polyphase switching regulator, which in turn contains the magnetic element of FIG. 6D.

FIG. 14 is an embodiment of the invention which provides isolated DC to DC converter 136, where DC power is applied (or received) at DC port 197 and DC power is received or applied at second port 103. Elements include inverter 199, high frequency transformer 201, AC to DC converter 151, and regulator 231, which in turn includes magnetic element 121. Depending on the selection of AC to DC converter 151, high-side devices 145-$x$, and low-side devices 147-$x$, the converter may be unidirectional or bidirectional.

Figure 15:
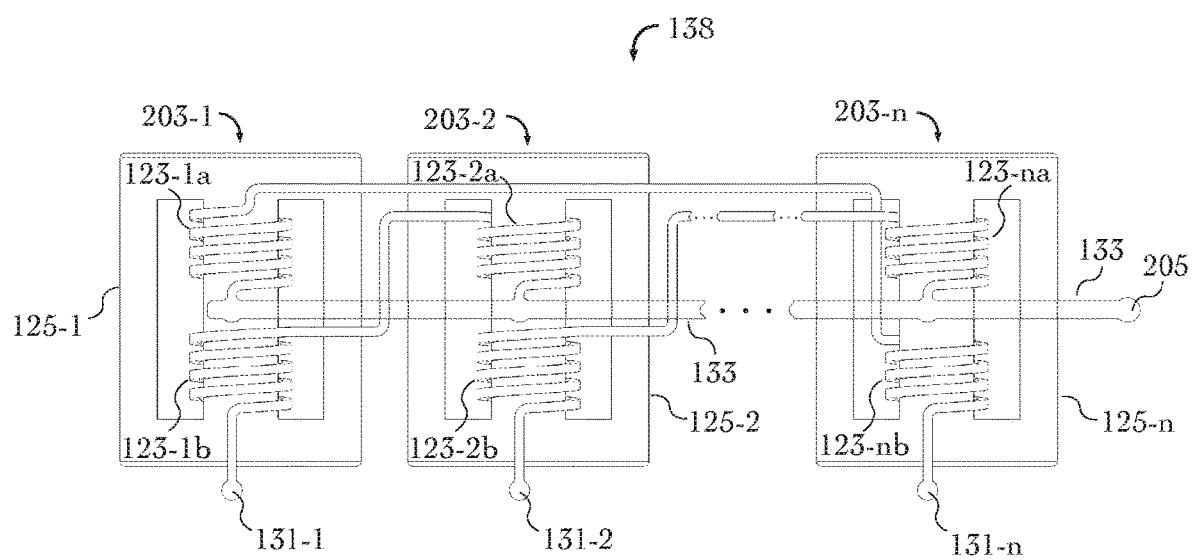
FIG. 15 is a plan view of an n-phase magnetic element comprising n number of identical transformers, each having two windings.

Different embodiments of averaging transformer 221 are possible. FIG. 15, is an embodiment of invention which provides averaging transformer 138, where n number of separate balancing transformers 203-$x$ are interconnected to provide the current summing and voltage-averaging functions. For the FIG. 15 embodiment, each transformer comprises a core and two similar windings, having equal numbers of turns. Windings are interconnected such that current equality is established between the $j^{th}$ and $j+1^{th}$ phases and between phases 1 and n. This in turn establishes current equality between all windings; voltage averaging follows as a consequence of energy conservation. Individual phase ports are 131-$x$, the summing bus is 133, and the summing port is 205.

Figure 16:
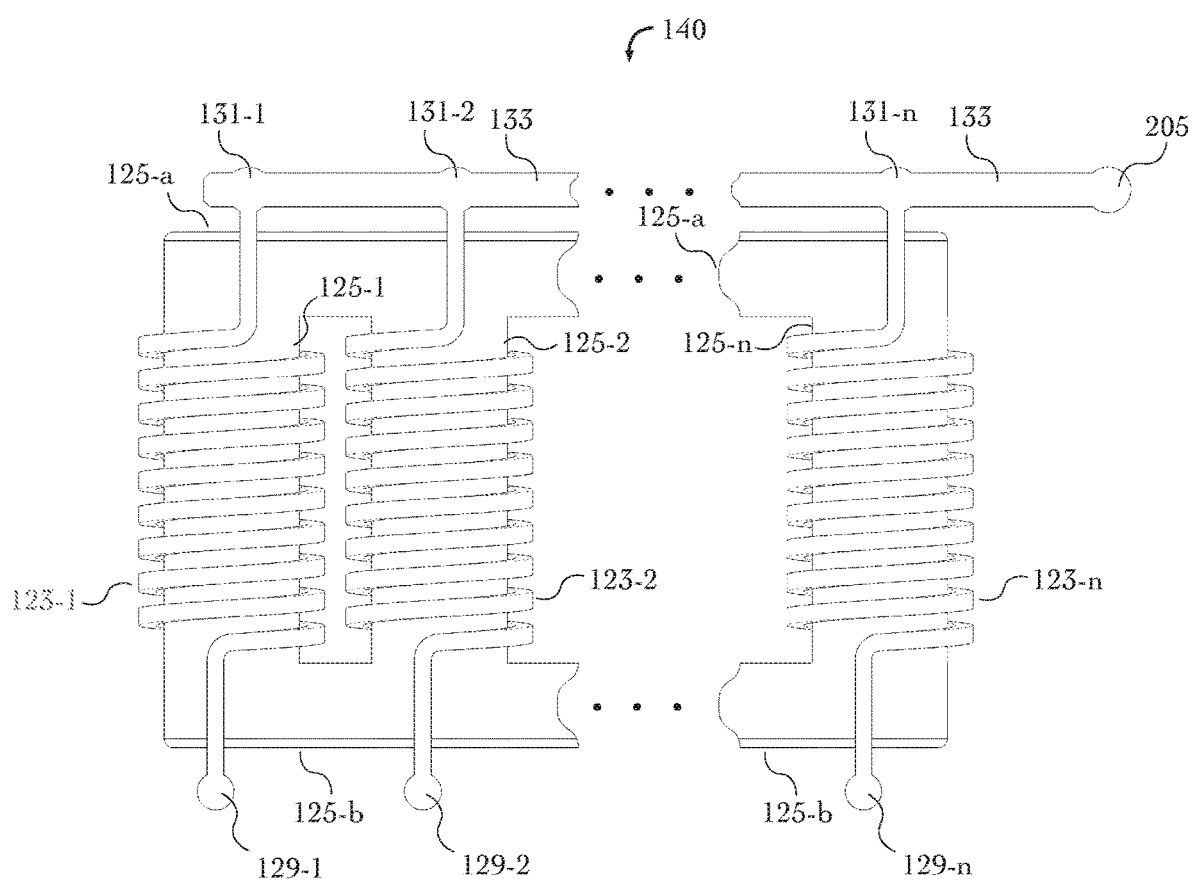
FIG. 16 is a plan view of an n-phase magnetic element which includes a single core with n number of prongs, each having one windings.

FIG. 16 is an embodiment of the invention which provides averaging transformer 140, comprising core 125 and windings 123-$x$. in turn, core 125 comprises n number of magnetic branches, 125-$x$, and common core members 125$a$ and 125$b$.

Each magnetic branch, 125-*x*, contains a single winding, 123-*x*; all windings have equal number of turns. Voltage averaging is established by the fact that magnetic fluxes associated with the n magnetic branches sum approximately to zero. Each of the n coil starts connects to summing bus 133 at connection points 131-*x*; in turn summing bus 133 connects to summing port 205. Each of the n coil finishes connects to a respective phase port 129-*x*. The FIG. 16 embodiment typically has relatively high leakage inductance; as such, ripple currents may be adequately limited without need of an external inductor. The down-side of the FIG. 16 embodiment is that the high leakage inductance is the result of high leakage flux, which in turn can cause portions of core 125 to prematurely saturate—thus limiting power handling capability.

Figure 17:
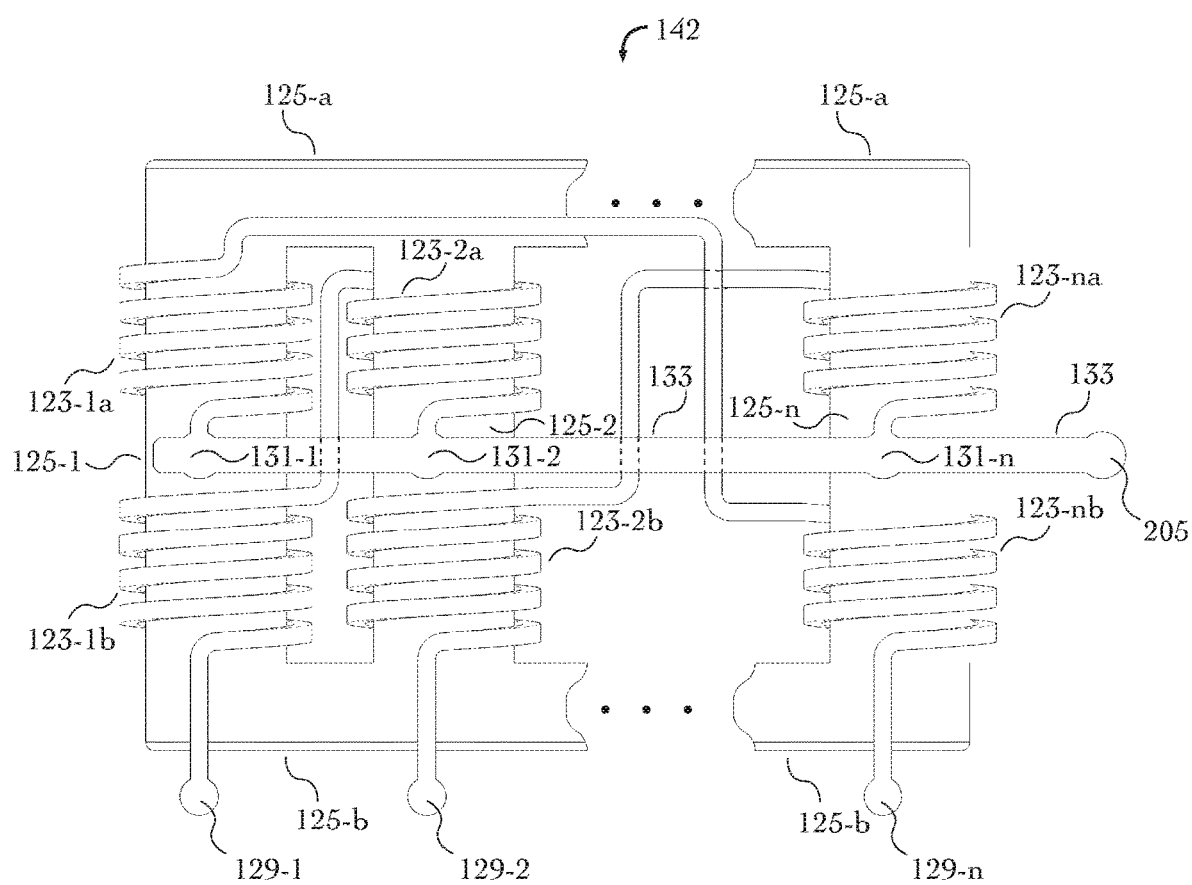
FIG. 17 is a plan view of an n-phase magnetic element which includes a single core with n number of prongs, each having two windings of equal number of turns.

FIG. 17 is an embodiment of the invention which provides averaging transformer 142, where magnetic core 125 is similar to that of FIG. 16, but where two windings, 123-*x*-*a* and 123-*x*-*b* are applied to each core branch 125-*x*. Phasing is such that the DC magnetomotive force produced by one winding cancels that of the second—thus reducing core saturation caused by high DC current components. Phase ports are 129-*x* and the averaging port is 205. Because of the reduced leakage flux, leakage inductance is also reduced (compared with the FIG. 16 embodiment) and therefore external inductance 127*b* may be required.

Figure 18:
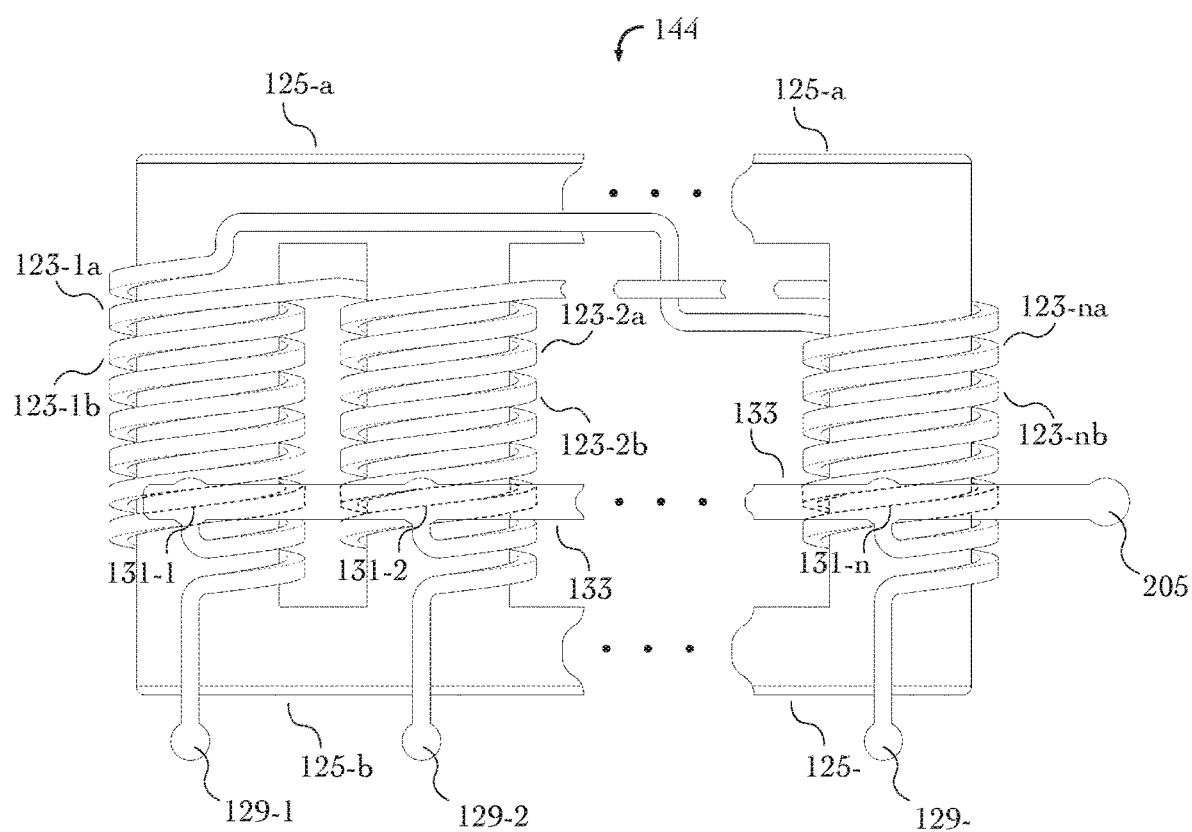
FIG. 18 is a plan view of an n-phase magnetic element which includes a single core with n number of prongs, each having two windings of equal number of turns which are bifilar wound.

FIG. 18 is an embodiment of the invention which provides averaging transformer 144, which is similar to that of FIG. 17, but where windings 123-*x*-*a* and 123-*x*-*b* are co-wound or bifilar wound such that leakage flux is further reduced. Individual phase ports are 129-*x* and the averaging port is 205. Because of the very low low leakage flux, leakage inductance is quite low. Accordingly, external inductance 127*b* may be required for this embodiment. Combinations of windings such as multiple windings which connect in parallel may be possible.

Figure 19:
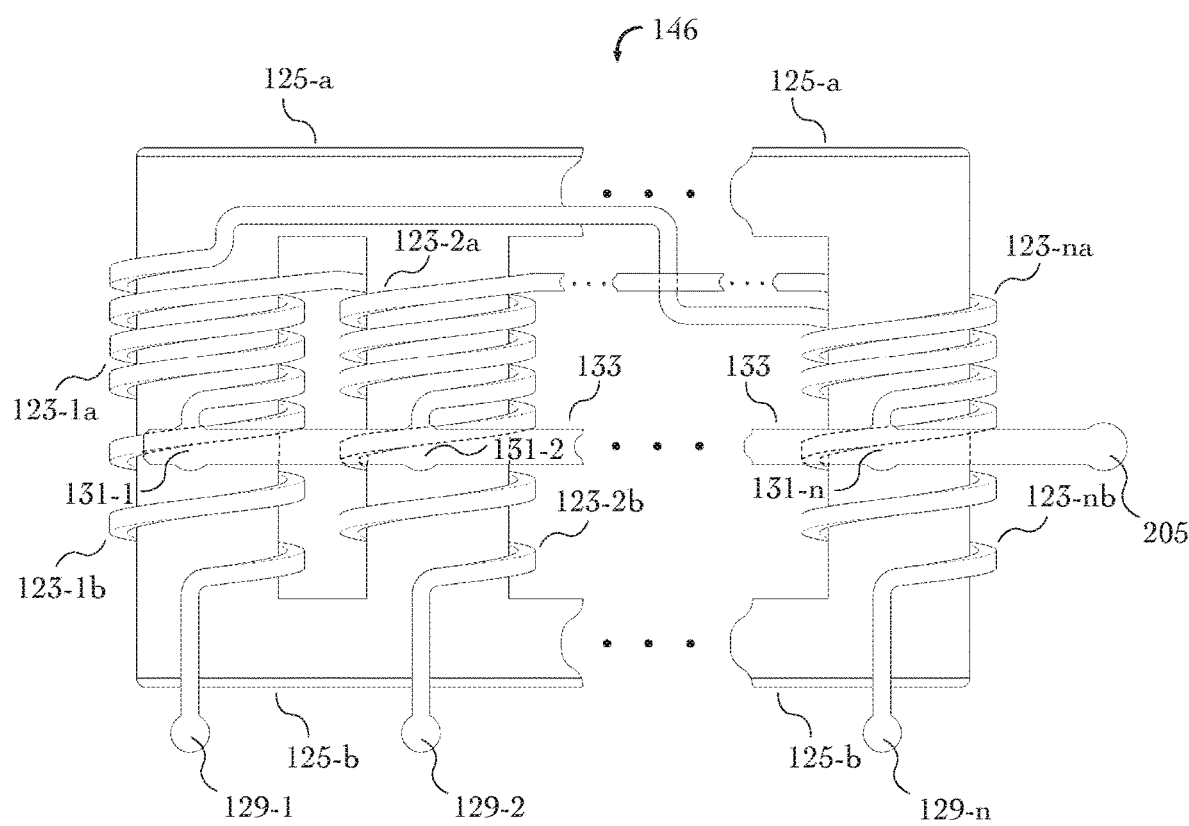
FIG. 19 is a plan view of an n-phase magnetic element which includes a single core with n number of prongs, each having two windings of unequal number of turns which are bifilar wound.

FIG. 19 is an embodiment of the invention which provides averaging transformer 146, which is similar to that of FIG. 18 having bifilar or co-wound windings, but where windings 123-*x*-*a* and 123-*x*-*b* have unequal numbers of turns. Because of the unpaired turns, leakage flux and leakage inductance are both increased compared with the FIG. 18 case where turns are equal. By selecting the difference in turns between 123-*x*-*a* and 123-*x*-*b*, leakage inductance can be controlled such that an optimal balance between leakage inductance and core saturation may be achieved. Individual phase ports are 129-*x* and the averaging port is 205.

Figure 20:
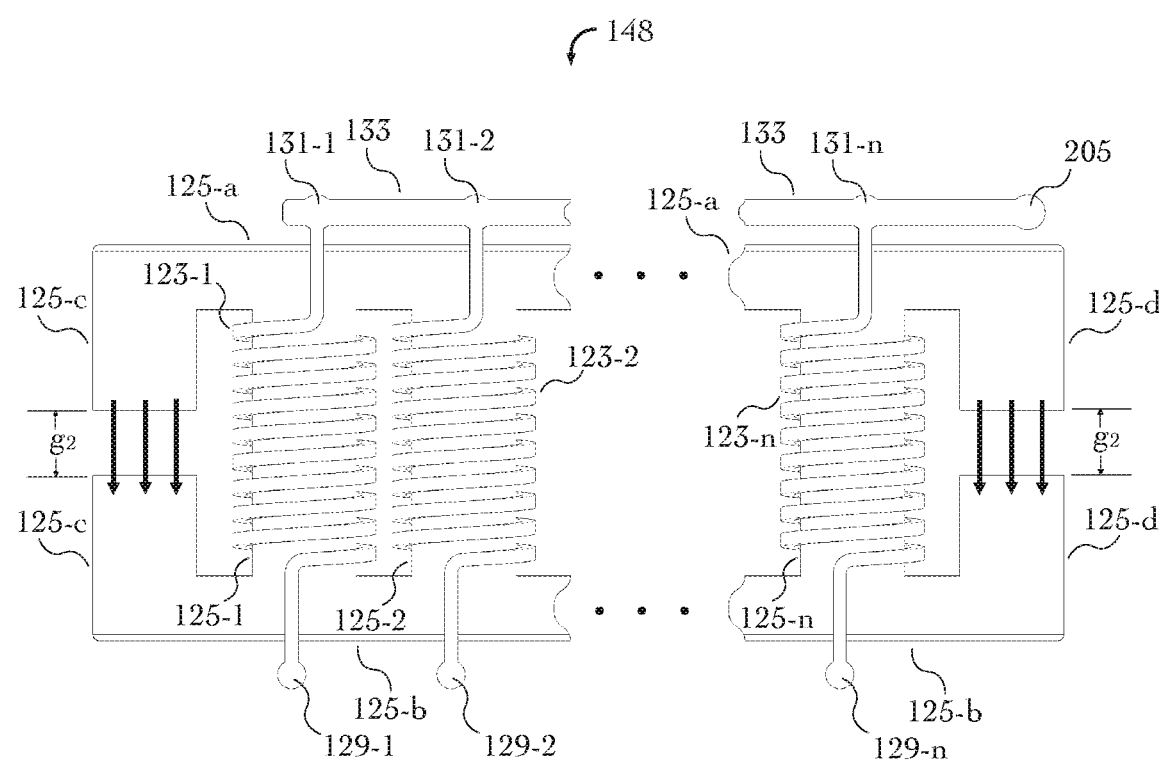
FIG. 20 is a plan view of an n-phase magnetic element which includes a single core with n number of prongs, each having one windings, and at least one additional prong which has no windings.

FIG. 20 is an embodiment of the invention which provides averaging transformer 148, which is similar to that of FIG. 19, except that first and second external core prongs 125-*c* and 125-*d* have been added which serve to increase the leakage inductance. The magnitude of the increased leakage inductance is controlled by prong gaps $g_2$; as gap dimensions are reduced, the leakage inductance increases, which in turn serves to reduce ripple currents. On the other hand, peak current capability, as limited by core saturation, is reduced as $g_2$ is reduced. While two external prongs are shown, any number of prongs or prong structures may be used.

Figure 21:
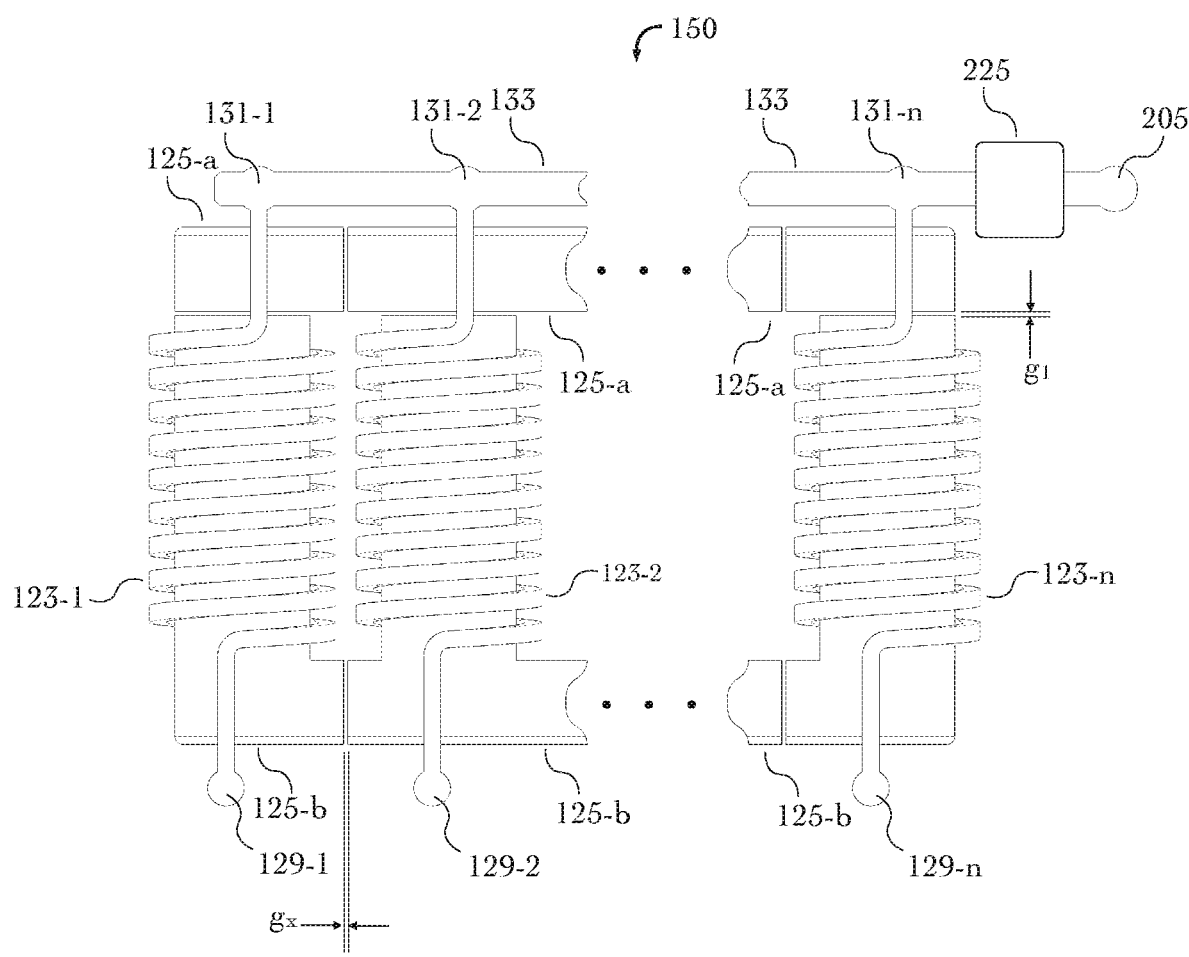
FIG. 21 is plan view of an n-phase magnetic element where the core is constructed from segments and where core gaps are present.

FIG. 21 is an embodiment of the invention which provides averaging transformer 150, which is similar to that of FIG. 16, except that core gaps $g_1$ and $g_x$ have been added to core 125. These gaps can provide several functions. They may be used to reduce the magnetizing inductance such that current sensors 135-*x* may be able to detect current components which are proportionate to magnetic flux density, thus enabling controller 139 to trim duty cycles such that magnetic saturation does not occur for any core prong 125-*x*. They may also help accommodate differential thermal expansion between the core and a potting cup, and they may simplify fabrication in that smaller core elements can be fabricated, as opposed to one large member.

Figure 22A:
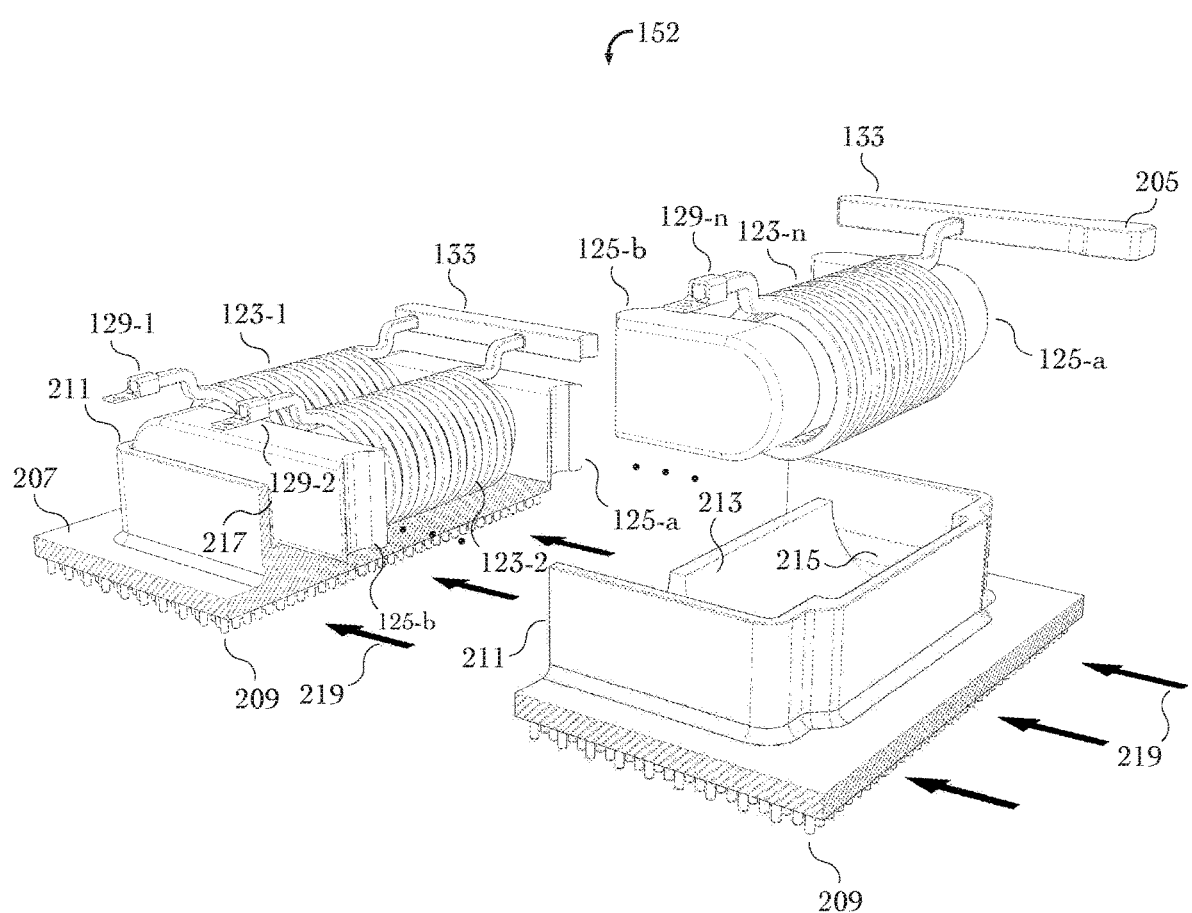
FIG. 22A is an exploded perspective drawing of an edge-wound n-phase magnetic element with an integrated heatsink.

FIG. 22A is an embodiment of the invention, shown as an exploded perspective drawing, which provides conduction-cooled averaging transformer 152. Elements include magnetic element 121, potting cup 211, and heatsink 207. In turn, potting cup 211 includes interior surfaces which closely conform with both winding and core surfaces such that efficient heat transfer is provided. In particular, first potting cup surface 213 is shaped such that close conformity with portions of windings 123-*x* is achieved, while second potting cup surface 215 is shaped such that close conformity with portions of core 125 is achieved. Gaps between potting cup surfaces, core surfaces and winding surfaces may be filled with thermally conductive potting material 217 to further aid heat transfer. Heatsink 207 is in thermal contact with potting cup 211 such that heat is efficiently transferred between the two. In some embodiments, potting cup 211 and heatsink 207 may be a single member, thus eliminating a thermal interface and thereby reducing thermal resistance. The heatsink in turn transfers heat to either an air stream 219 or a liquid stream 219 with the aid of heatsink fins 209. Heatsink fins 209 may be pin fins (as shown) or any other structure which provides efficient heat transfer.

Figure 22B:
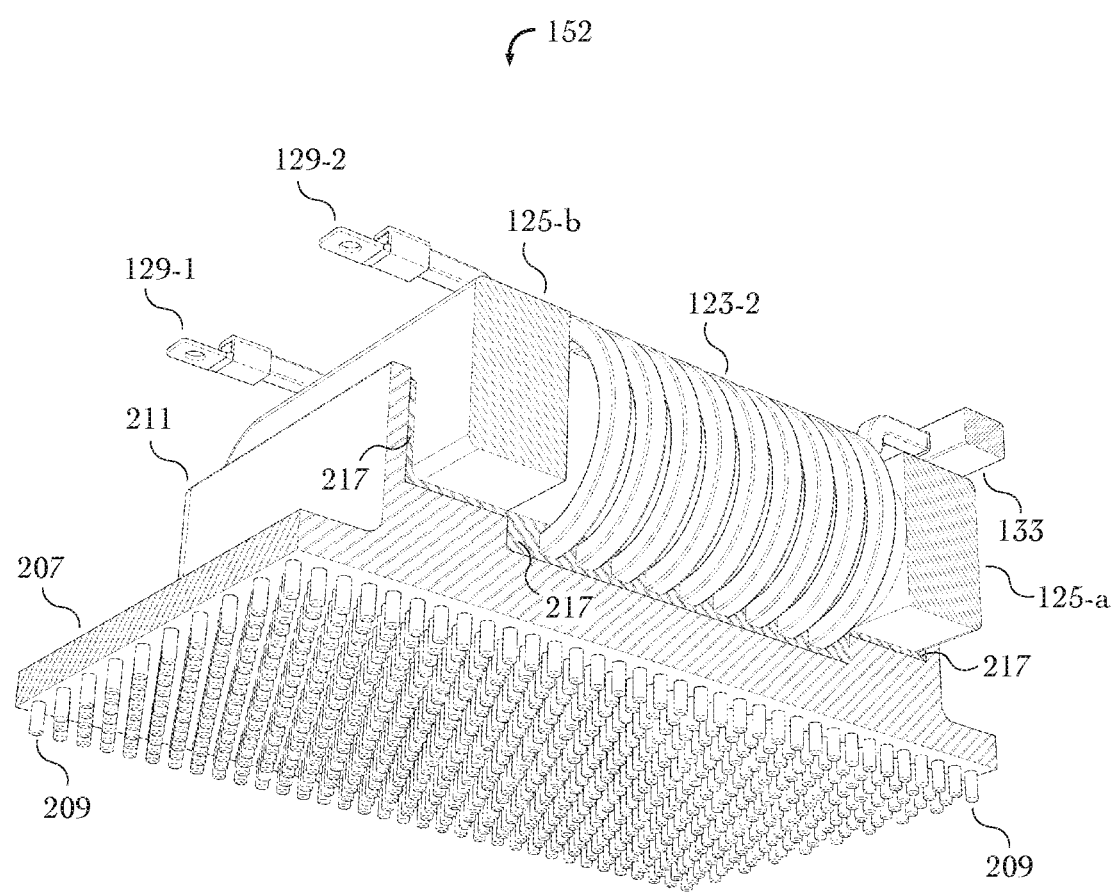
FIG. 22B is a sectioned perspective drawing of an edge-wound n-phase magnetic element with an integrated heatsink.

FIG. 22B is a sectioned perspective drawing of averaging transformer 158 which further clarifies details of potting cup 211, thermally conductive material 217, heatsink 207, magnetic element core 125, and phase windings 123-*x*.

Figure 23:
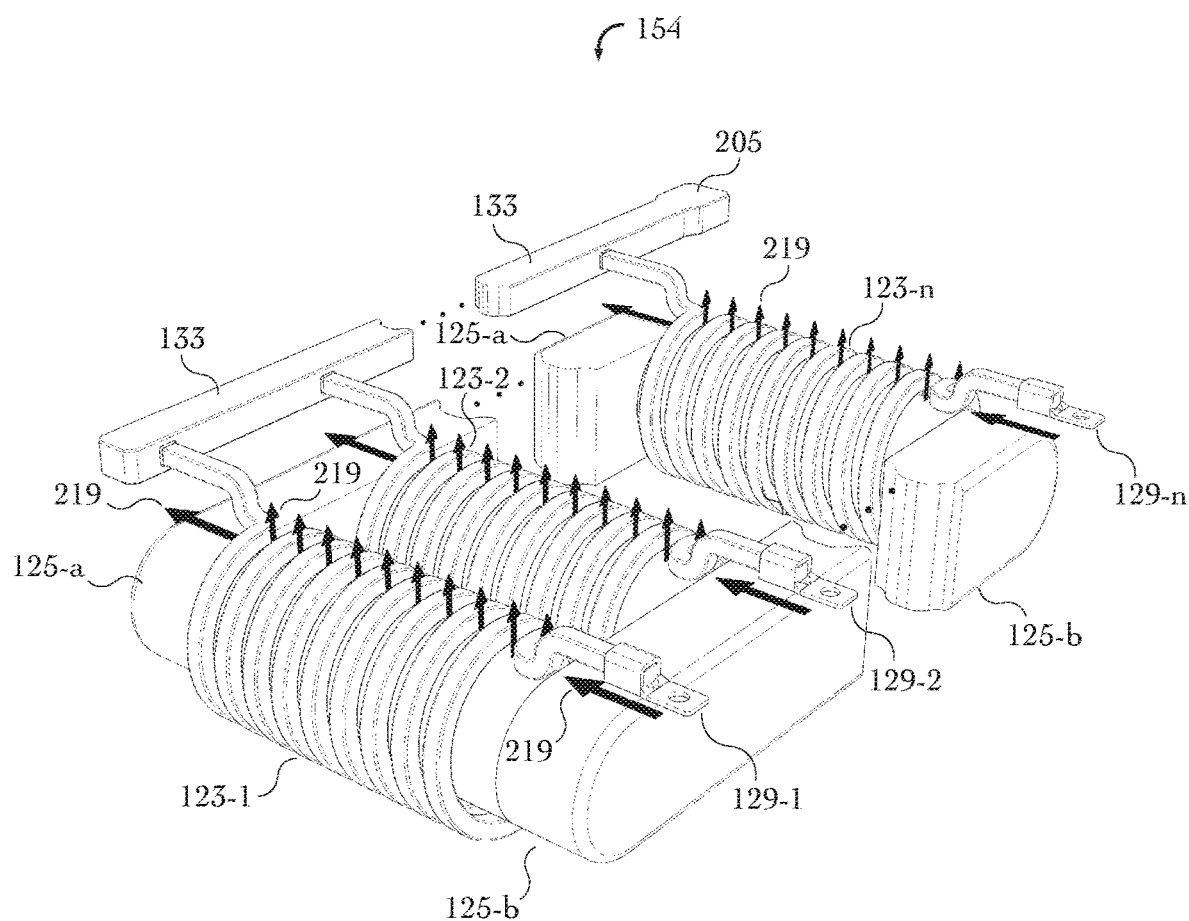
FIG. 23 is a perspective drawing of an edge-wound magnetic element where coolant is in direct contact with both the windings and the core.

FIG. 23 is an embodiment of the invention which provides averaging transformer 154 with direct fluid cooling, where coolant is in direct contact with at least portions of windings 123-*x*. In some case, small gaps may be provided between winding 123-*x* turns; coolant is radially directed through these gaps as shown in the figure. In some embodiments, coolant may also be directed axially along surface portions of core prongs 125-*x* such that core cooling is also provided. While the winding configuration of FIG. 16 is shown, it is to noted that the cooling geometry of FIG. 23 can be applied to other winding configurations, including those of FIGS. 15 through 21.

As used herein, a "port" of an element or circuit is an interface to another element or circuit. A port need not be an external interface; for example, an interface between a first portion of a circuit and a second portion of the circuit may be a port of the first portion of the circuit and a port of the second portion of the circuit.

In FIGS. 15-21, EE cores are shown but other core configurations, e.g., toroidal cores, may be used instead.

As used herein, an "averaging transformer" is a magnetic element with n phase ports and an averaging port (or "summing port"). In an ideal averaging transformer, the voltage at the averaging port is equal to the average of the voltages of the n phase ports, and the currents are equal. In a real averaging transformer, the voltage at the averaging port is substantially equal to the average of the voltages at the n phase ports, and the currents are substantially equal (differences in behavior between the real averaging transformer and the ideal averaging transformer being due to mechanisms such as magnetizing currents (in a transformer having a core with a relative permeability greater than 1)).

As used herein the terms "averaging port" and "summing port" are used interchangeable and are synonymous.

As used herein, "winding" and "coil" are synonymous; each of these two terms means one or more turns of a conductor.

As used herein, "co-wound" turns of two windings are interleaved. For example, a turn of a first winding that is "co-wound" with a second winding is between two turns of the second winding.

As used herein, the word "or" is inclusive, so that, for example, "A or B" means any one of (i) A, (ii) B, and (iii) A and B.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

What is claimed is:

1. A system, comprising:
   a first polyphase regulator, comprising:
      a first magnetic element,
      n switching poles, n being an integer greater than 2,
      a first port having a first node and a second node, and
      a second port having a first node and a second node;
   an alternating current to direct current (AC to DC) converter,
   a transformer connected to an input of the AC to DC converter, and
   a second polyphase regulator, configured to receive power from a secondary side of the transformer,
   wherein:
      the first magnetic element comprises n phase ports and an averaging port;
      each of the n switching poles includes a phase node; and
      the first polyphase regulator and the second polyphase regulator are not galvanically isolated from each other.

2. The system of claim 1, wherein the first polyphase regulator is configured to operate as:
   a buck mode regulator, or
   a boost mode regulator, or
   a flyback regulator.

3. The system of claim 1, wherein the AC to DC converter comprises a diode configured to allow current to flow in one direction only between an input conductor and an output conductor.

4. The system of claim 1, wherein the AC to DC converter comprises a switch and a controller configured to control the switch to allow current to flow in one direction only between an input conductor and an output conductor.

5. The system of claim 1, wherein the AC to DC converter comprises:
   an input rectifier,
   an inverter,
   a high frequency transformer, and
   a high frequency rectifier.

6. The system of claim 1, wherein the transformer is configured to be connected to an input of the AC to DC converter.

7. The system of claim 1, wherein the first polyphase regulator is configured to be connected to a vehicle, to supply power to the vehicle, and to receive, from the vehicle, a control signal to control:
   an output voltage of the first polyphase regulator or
   an output current of the first polyphase regulator.

8. A vehicle comprising the system of claim 1.

9. The vehicle of claim 8, further comprising a cooling system for cooling the first polyphase regulator or the AC to DC converter.

10. The system of claim 1, further comprising a cooling system for cooling the first polyphase regulator or the AC to DC converter.

11. The system of claim 1, wherein the first magnetic element comprises an averaging transformer.

12. The system of claim 11, wherein the first magnetic element further comprises an inductor.

13. The system of claim 11, wherein the magnetic element comprises a plurality of magnetic branches, each branch having two windings.

14. The system of claim 1, wherein the system is capable:
   of receiving power at the first port and producing power at the second port; and
   of receiving power at the second port and producing power at the first port.

15. A system, comprising:
   a first polyphase regulator, comprising:
      a first magnetic element,
      n switching poles, n being an integer greater than 2,
      a first port having a first node and a second node, and
      a second port having a first node and a second node; and
   an alternating current to direct current (AC to DC) converter,
   wherein:
      the first magnetic element comprises n phase ports and an averaging port;
      each of the n switching poles includes a phase node;
      the first magnetic element comprises an averaging transformer;
      the first magnetic element comprises a plurality of magnetic branches, each branch having two windings; and
   two turns of a first winding of a first branch are co-wound with two turns of a second winding of a second branch.

16. The system of claim 15, wherein the second winding comprises a turn that is not co-wound with the first winding.

17. The system of claim 16, wherein the second winding has more turns than the first winding.

* * * * *